United States Patent
Zhu et al.

(10) Patent No.: US 12,508,556 B2
(45) Date of Patent: Dec. 30, 2025

(54) STATIC MIXER

(71) Applicants: DOW SILICONES CORPORATION, Midland, MI (US); THE REGENTS OF THE UNIVERSITY OF MICHIGAN, Ann Arbor, MI (US)

(72) Inventors: Bizhong Zhu, Midland, MI (US); Stanley Yee, Midland, MI (US); Matthew Hildner, Ann Arbor, MI (US); Jeffrey Plott, Ann Arbor, MI (US); Albert Shih, Ann Arbor, MI (US)

(73) Assignees: Dow Silicones Corporation, Midland, MI (US); The Regents of the University of Michigan, Ann Arbor, MI (US)

( * ) Notice: Subject to any disclaimer, the term of this patent is extended or adjusted under 35 U.S.C. 154(b) by 771 days.

(21) Appl. No.: 17/778,072

(22) PCT Filed: Nov. 20, 2020

(86) PCT No.: PCT/US2020/061459
§ 371 (c)(1),
(2) Date: May 19, 2022

(87) PCT Pub. No.: WO2021/108245
PCT Pub. Date: Jun. 3, 2021

(65) Prior Publication Data
US 2022/0410094 A1    Dec. 29, 2022

Related U.S. Application Data

(60) Provisional application No. 62/941,945, filed on Nov. 29, 2019.

(51) Int. Cl.
*B01F 25/4314* (2022.01)
*B01F 25/431* (2022.01)
(Continued)

(52) U.S. Cl.
CPC .. *B01F 25/43141* (2022.01); *B01F 25/43172* (2022.01); *B01F 25/4322* (2022.01);
(Continued)

(58) Field of Classification Search
CPC .......... B01F 25/43141; B01F 25/43172; B01F 25/4322; B01F 25/4314; B01F 25/4317;
(Continued)

(56) References Cited

U.S. PATENT DOCUMENTS

| | | | |
|---|---|---|---|
| 3,804,376 A | 4/1974 | Clasen | |
| 4,316,673 A | * 2/1982 | Speer | B01F 25/4524 366/337 |

(Continued)

FOREIGN PATENT DOCUMENTS

| | | |
|---|---|---|
| CN | 105727780 A | 7/2016 |
| CN | 107930429 A | 4/2018 |

(Continued)

OTHER PUBLICATIONS

Machine assisted English translation of CN105642145B obtained from https://patents.google.com/patent on Nov. 18, 2022, 6 pages.

(Continued)

*Primary Examiner* — Duane Smith
*Assistant Examiner* — Patrick M McCarty
(74) *Attorney, Agent, or Firm* — Warner Norcross + Judd LLP

(57) ABSTRACT

A static mixer is disclosed. The static mixer comprises a housing (22) defining an internal mixing cavity (36) that longitudinally extends along a central axis between an inlet (38) and an outlet (40) and is adapted for axial flow of a fluid therethrough. The static mixer also comprises a mixing element (42) disposed within the mixing cavity (36). The mixing element (42) is configured to be free from an impingement surface oriented substantially perpendicular to (Continued)

a main direction of fluid flow through the internal mixing cavity (36). The mixing element (42) comprises an elongated mixing blade that is oriented longitudinally within the mixing cavity (36) and comprises a nose axially oriented toward the inlet (38). The static mixer may comprise a heat-exchanging jacket integrally formed with the housing (22). An additive manufacturing system comprising the static mixer, and methods of making and using the same, are also disclosed.

18 Claims, 14 Drawing Sheets

(51) Int. Cl.
| | | |
|---|---|---|
| *B01F 25/432* | (2022.01) | |
| *B01F 35/92* | (2022.01) | |
| *B29B 7/32* | (2006.01) | |
| *B29B 7/72* | (2006.01) | |
| *B29C 64/314* | (2017.01) | |
| *B33Y 30/00* | (2015.01) | |
| *B33Y 40/00* | (2020.01) | |

(52) U.S. Cl.
CPC .............. *B01F 35/92* (2022.01); *B29B 7/325* (2013.01); *B29B 7/72* (2013.01); *B29C 64/314* (2017.08); *B33Y 30/00* (2014.12); *B33Y 40/00* (2014.12)

(58) Field of Classification Search
CPC .............. B01F 25/43171; B01F 25/432; B01F 25/4315; B01F 25/43151; B01F 25/431; B01F 25/4311; B01F 25/4313; B29B 7/325
See application file for complete search history.

(56) References Cited

U.S. PATENT DOCUMENTS

| | | | |
|---|---|---|---|
| 4,786,368 A * | 11/1988 | York ...................... | C10B 53/06 |
| | | | 366/337 |
| 5,688,047 A * | 11/1997 | Signer ............... | B01F 25/43161 |
| | | | 366/337 |
| 5,758,967 A | 6/1998 | King | |
| 5,800,059 A | 9/1998 | Cooke et al. | |
| 6,015,229 A | 1/2000 | Cormack et al. | |
| 6,109,781 A | 8/2000 | Ogasawara et al. | |
| RE36,969 E | 11/2000 | Streiff et al. | |
| 6,623,155 B1 | 9/2003 | Baron | |
| 6,769,801 B1 | 8/2004 | Maurer et al. | |
| 2002/0039547 A1 | 4/2002 | Nelson et al. | |
| 2003/0031090 A1 | 2/2003 | Ho et al. | |
| 2003/0164296 A1 | 9/2003 | Squires et al. | |
| 2004/0114461 A1 | 6/2004 | Fuglister | |
| 2004/0125691 A1 | 7/2004 | Streiff et al. | |
| 2004/0129829 A1 | 7/2004 | Hoerle et al. | |
| 2004/0223408 A1 | 11/2004 | Mathys et al. | |
| 2005/0190643 A1 | 9/2005 | Hansen | |
| 2006/0158961 A1 | 7/2006 | Ruscheweyh et al. | |
| 2007/0158451 A1 | 7/2007 | Mao et al. | |
| 2007/0274877 A1 | 11/2007 | Bush et al. | |
| 2008/0079179 A1 | 4/2008 | Lundgreen et al. | |
| 2009/0003127 A1 | 1/2009 | Beckmann et al. | |
| 2009/0065957 A1 | 3/2009 | Mao et al. | |
| 2011/0158852 A1* | 6/2011 | Castro ................. | B01F 25/4521 |
| | | | 422/69 |
| 2011/0162353 A1 | 7/2011 | Vanvolsem et al. | |
| 2011/0174408 A1 | 7/2011 | Lundberg et al. | |
| 2011/0310697 A1* | 12/2011 | Hirschberg ............. | B01F 23/30 |
| | | | 366/337 |
| 2013/0104531 A1 | 5/2013 | Cho et al. | |
| 2013/0188440 A1 | 7/2013 | Tabikh et al. | |
| 2013/0286769 A1 | 10/2013 | Baron | |
| 2013/0336084 A1 | 12/2013 | Janz | |
| 2014/0014270 A1 | 1/2014 | Shah et al. | |
| 2014/0134085 A1 | 5/2014 | Ivanova et al. | |
| 2014/0298781 A1 | 10/2014 | Naga et al. | |
| 2015/0083375 A1 | 3/2015 | Heusser | |
| 2015/0360176 A1 | 12/2015 | Bui et al. | |
| 2016/0333253 A1 | 11/2016 | Logan et al. | |
| 2017/0095780 A1 | 4/2017 | Richie et al. | |
| 2017/0266631 A1 | 9/2017 | Smith et al. | |
| 2019/0308342 A1 | 10/2019 | Butler | |
| 2019/0338888 A1 | 11/2019 | Selirio et al. | |
| 2020/0061555 A1* | 2/2020 | Kirmeier ............... | B01F 27/092 |
| 2020/0358325 A1* | 11/2020 | Yun ........................ | H02K 5/203 |
| 2021/0253452 A1* | 8/2021 | Horne .................... | C25B 11/02 |
| 2021/0331389 A1* | 10/2021 | Shields ................. | B29C 64/106 |
| 2021/0339209 A1* | 11/2021 | Lundkvist ........... | B01F 25/4521 |

FOREIGN PATENT DOCUMENTS

| | | | |
|---|---|---|---|
| CN | 108339424 A | | 7/2018 |
| CN | 105642145 B | | 12/2018 |
| DE | 2262016 A1 | | 6/1974 |
| DE | 102009029420 A1 | | 3/2011 |
| DE | 102010032679 A1 | | 2/2012 |
| DE | 102015207976 A1 | | 11/2016 |
| EP | 1166862 B1 | | 2/2004 |
| FR | 2807336 A1 | | 10/2001 |
| FR | 2948297 A3 | | 1/2011 |
| GB | 2533353 A | | 6/2016 |
| JP | 2008208761 A | | 9/2008 |
| JP | 2013094745 A | * | 5/2013 |
| WO | 2004060542 A1 | | 7/2004 |
| WO | 2007113627 A1 | | 10/2007 |
| WO | 2016074655 A1 | | 5/2016 |

OTHER PUBLICATIONS

Machine assisted English translation of CN105727780A obtained from https://patents.google.com/patent on Nov. 18, 2022, 4 pages.
Machine assisted English translation of CN107930429A obtained from https://patents.google.com/patent on Nov. 18, 2022, 6 pages.
Machine assisted English translation of CN108339424A obtained from https://patents.google.com/patent on Nov. 18, 2022, 5 pages.
Machine assisted English translation of DE102009029420A1 obtained from https://patents.google.com/patent on Nov. 18, 2022, 5 pages.
Machine assisted English translation of DE102010032679A1 obtained from https://patents.google.com/patent on Nov. 18, 2022, 5 pages.
Machine assisted English translation of EP1166862B1 obtained from https://patents.google.com/patent on Nov. 18, 2022, 8 pages.
Machine assisted English translation of FR2807336A1 obtained from https://patents.google.com/patent on Nov. 21, 2022, 4 pages.
Machine assisted English translation of FR2948297A3 obtained from https://patents.google.com/patent on Nov. 18, 2022, 4 pages.
Machine assisted English translation of JP2008208761A obtained from https://patents.google.com/patent on Nov. 18, 2022, 4 pages.
Machine assisted English translation of WO2016074655A1 obtained from https://patents.google.com/patent on Nov. 18, 2022, 10 pages.
International Search Report for PCT/US2020/061459 dated Jun. 4, 2021, 8 pages.
Machine assisted English translation of DE2262016 obtained from https://patents.google.com/patent on Nov. 4, 2022, 5 pages.
Machine assisted English translation of DE102015207976 obtained from https://patents.google.com/patent on Nov. 4, 2022, 5 pages.
Gardiner et al., "Catalytic Static Mixers for the Continuous Flow Hydrogenation of a Key Intermediate of Linezolid (Zyvox)", Organic Process Research & Development, 22(10), (2018) pp. 1448-1452.
Levesque et al., "Advancing Flow Chemistry Portability: A Simplified Approach to Scaling Up Flow Chemistry", Organic Process Research & Development, 22(8), (2018) pp. 1015-1021.
Armbruster et al., "Fouling mitigation in Tubular Membranes by 3D-printed Turbulence Promoters", Journal of Membrane Science, 554, (2018) pp. 156-163.

(56) References Cited

OTHER PUBLICATIONS

Nguyen et al., "Hydrogenation of Vinyl Acetate Using a Continuous Flow Tubular Reactor with Catalytic Static Mixers", Chemical Engineering and Processing, 124, (2017) pp. 215-221.

* cited by examiner

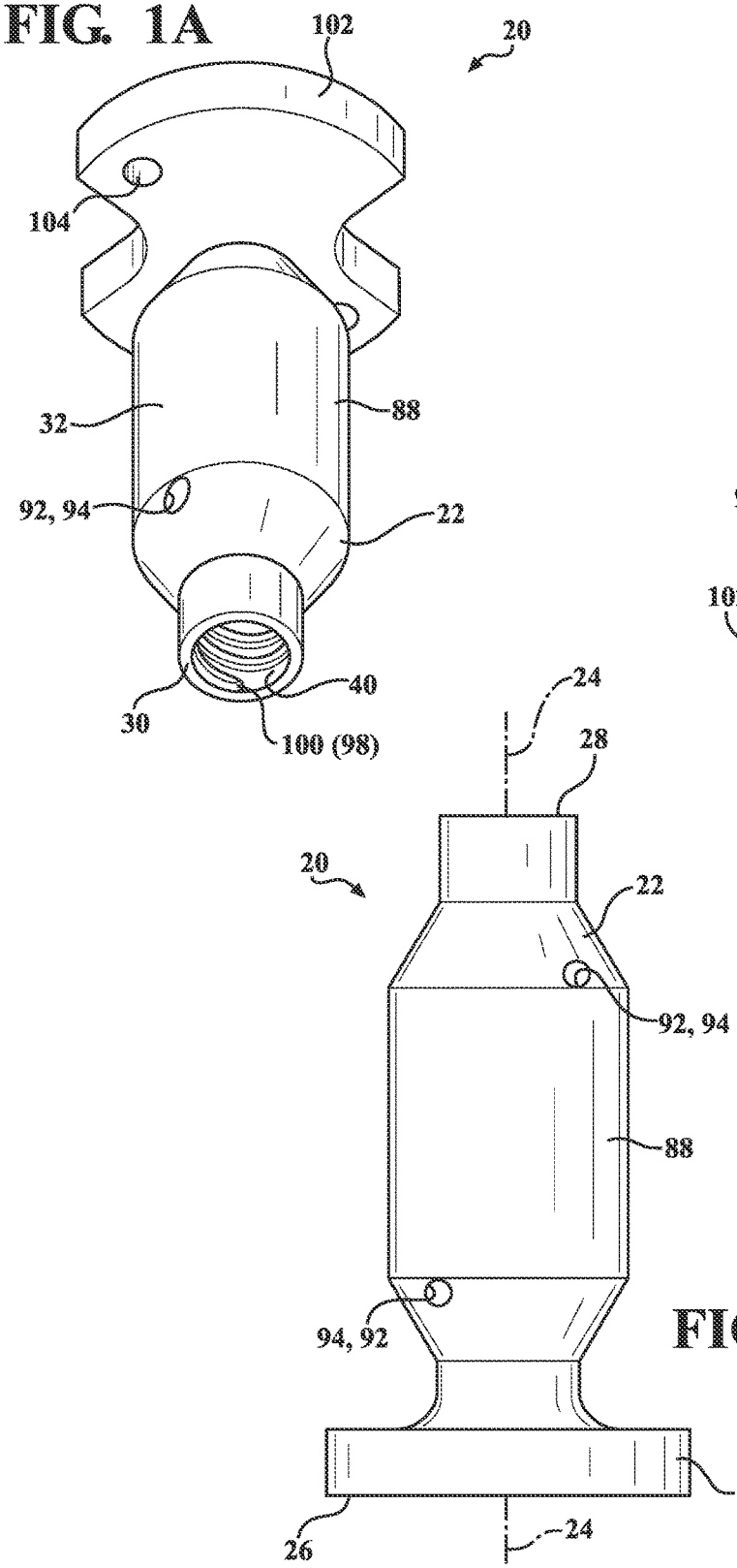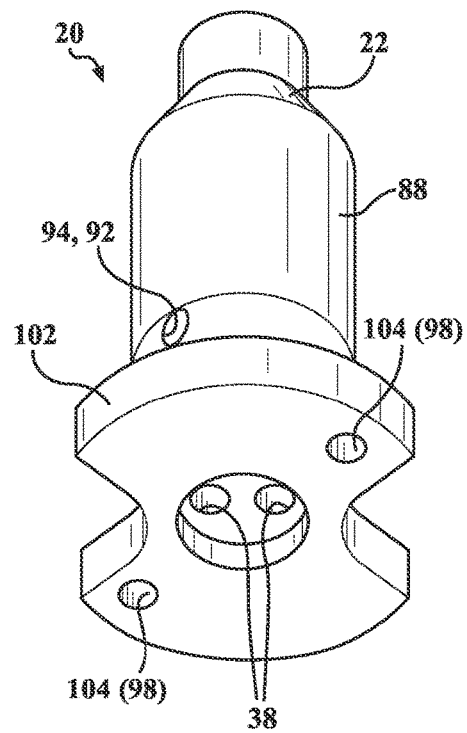

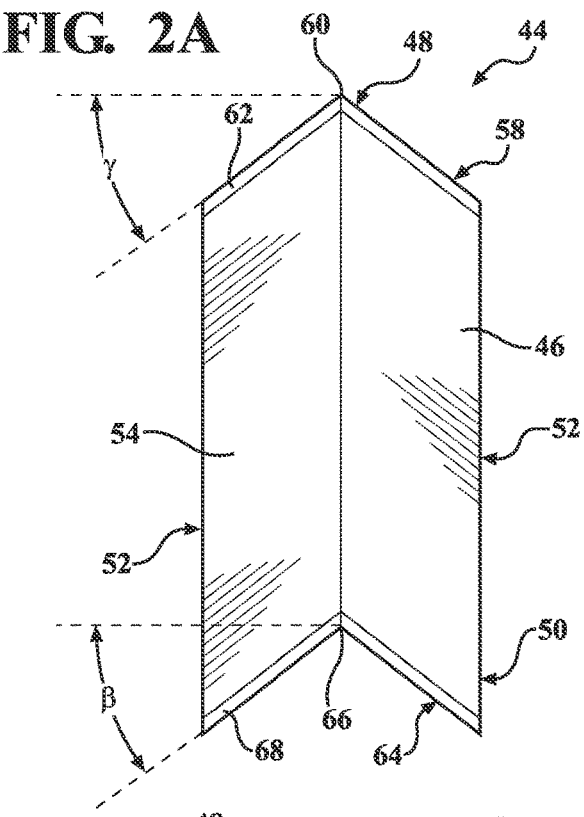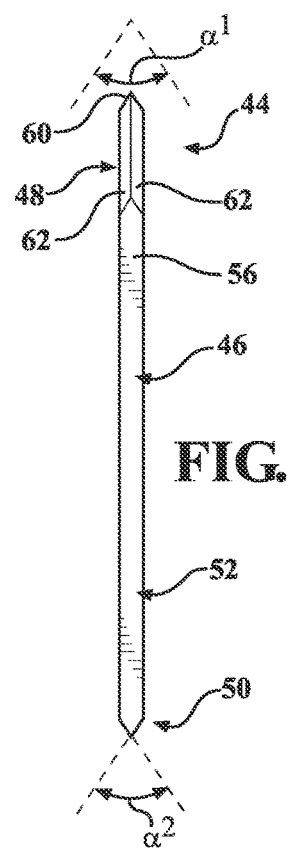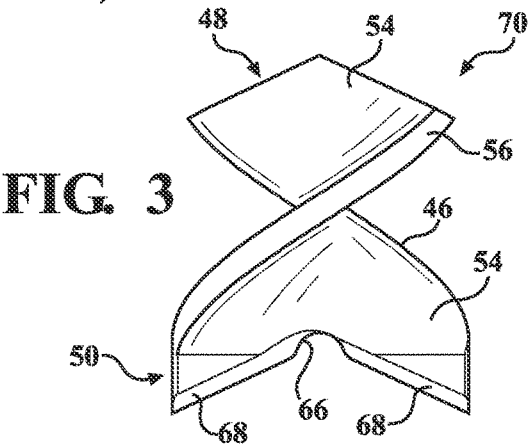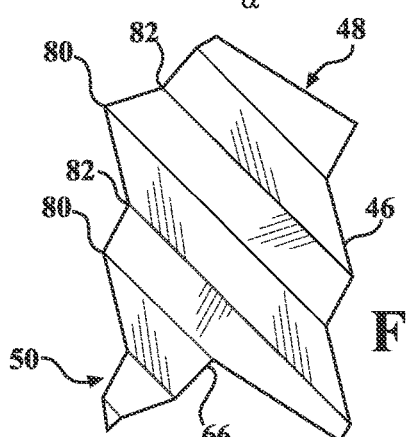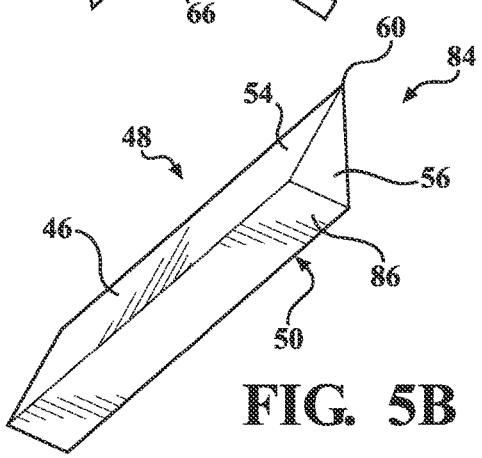

FIG. 19A
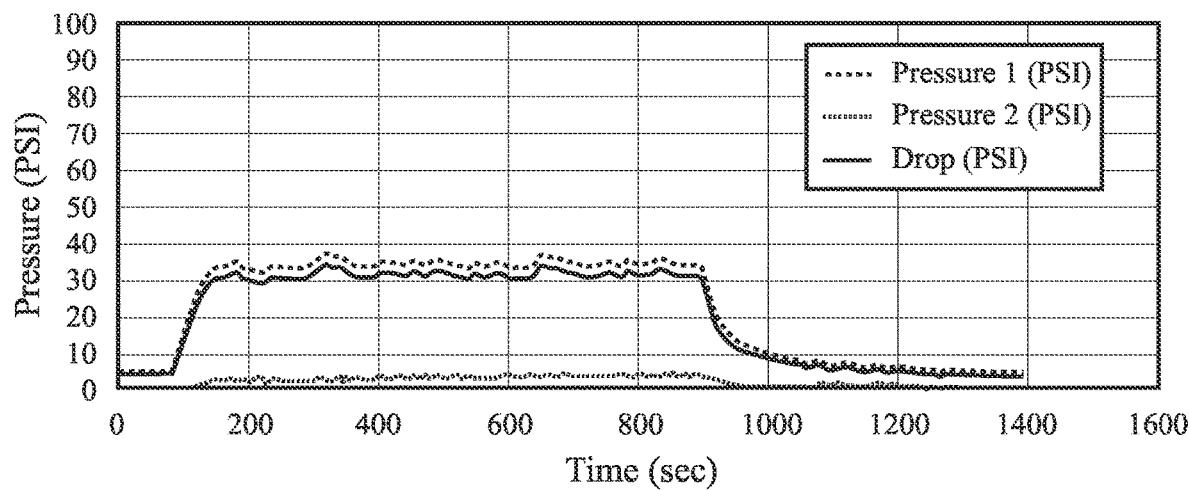
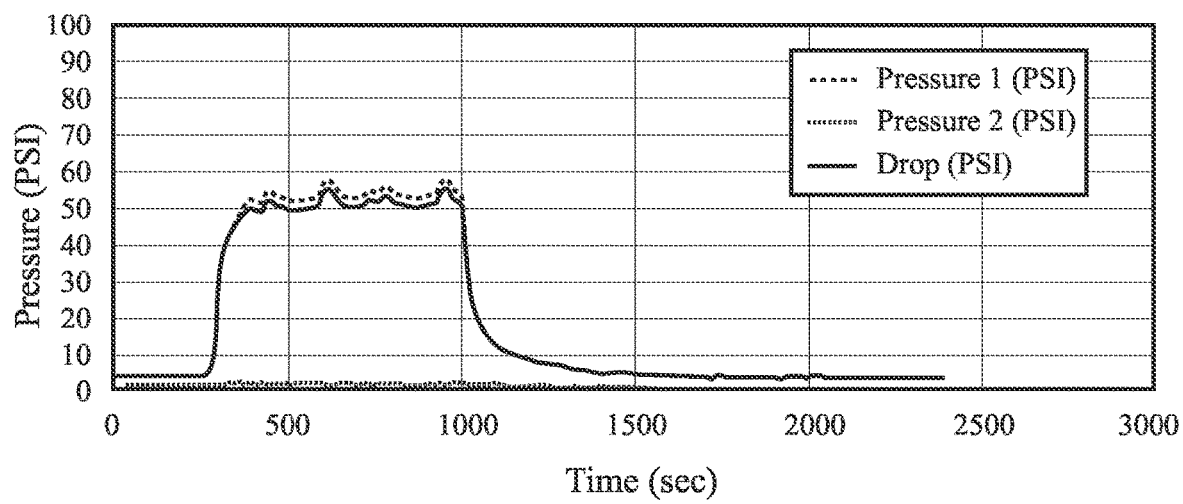
FIG. 19B

FIG. 20A
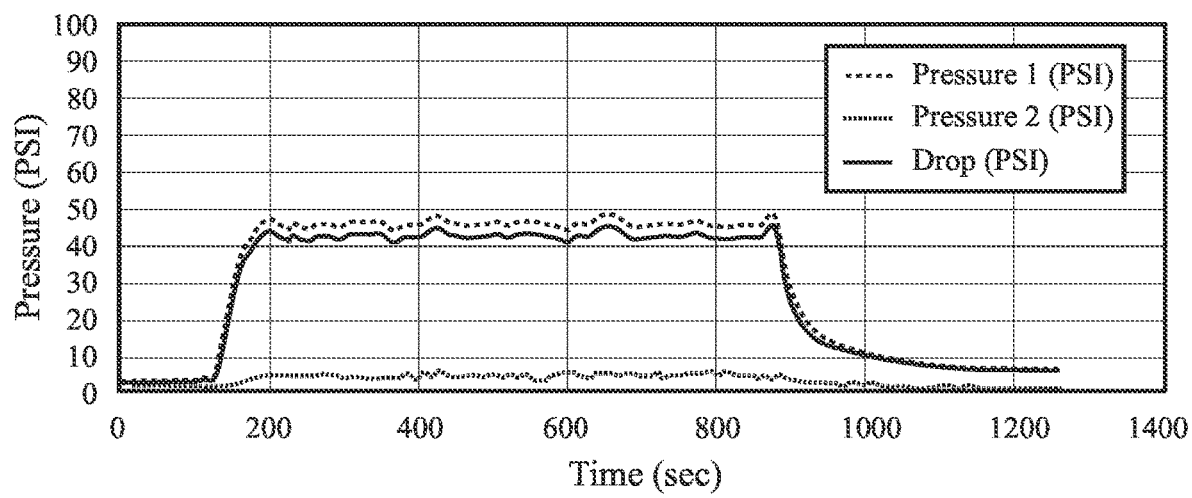
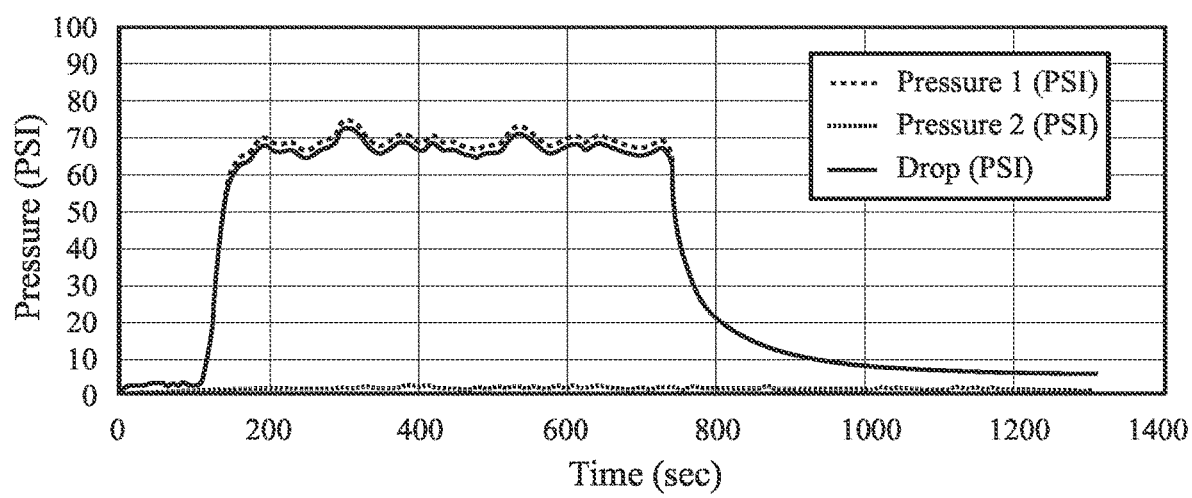
FIG. 20B

FIG. 21A
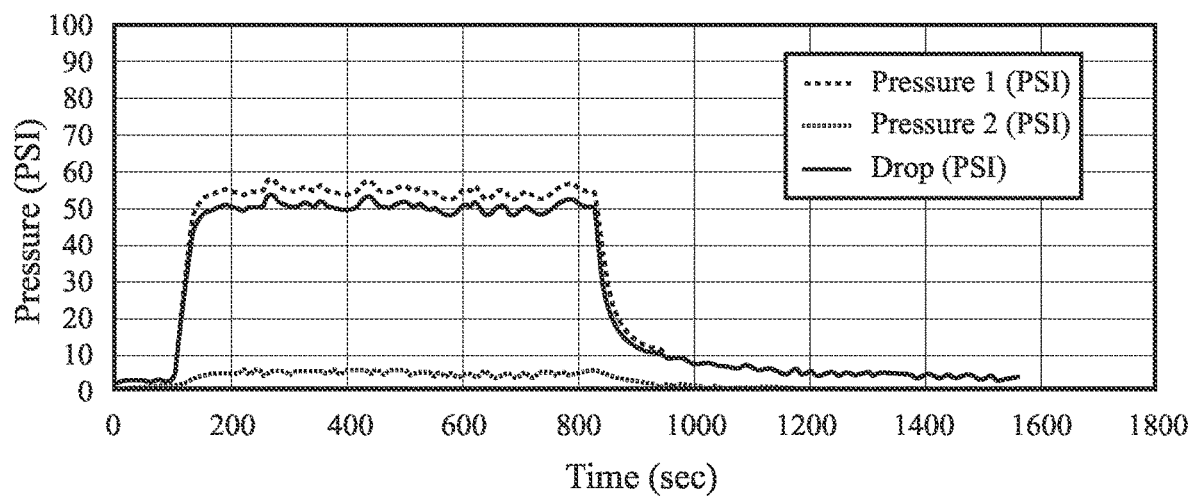
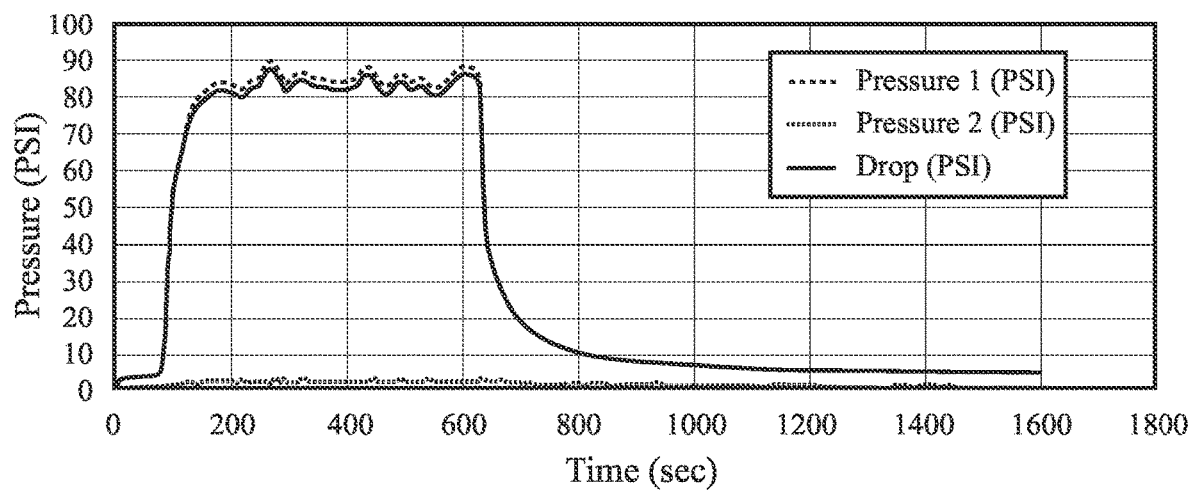
FIG. 21B

Dispensing Tip

Insulation (or cooling) Jackets for dispensing pump

Motor

Material A

Material B

Cooling Jacket

Active Mixing shaft

Dispensing tip

STATIC MIXER

CROSS REFERENCE TO RELATED APPLICATIONS

This application is the U.S. National Stage of International Application No. PCT/US2020/061459 filed on 20 Nov. 2020, which claims priority to and all advantages of U.S. Provisional Patent Application No. 62/941,945 filed on 29 Nov. 2019, the content of which is incorporated herein by reference.

FIELD OF THE INVENTION

The present disclosure generally relates to mixing apparatus and, more specifically, to a static mixer and an additive manufacturing system comprising the same

DESCRIPTION OF THE RELATED ART

Static mixers are utilized in a variety of industries for mixing, dispersing, and contacting various gases, liquids, and other materials. Static mixers generally include a tubular housing disposed about fixed/motionless internal baffles that generate turbulence to produce mixing and dispersion effects as materials to be mixed are passed through the housing (e.g. by pumping, gravity, etc.) and around the baffles. Advantages associated with static mixers over other mixing systems include their small volume requirements, low maintenance, and simple operation.

Unfortunately, however, conventional static mixers suffer from pressure variations and drops, e.g. due to dead spots created by the housing and/or baffles, changing viscosities of materials being mixed together, etc. These dead spots may also result in undesired temperature fluctuations as increasing friction superheats the materials being mixed and, over time, components of the static mixer proximal the dead spot. These pressure and temperature variations limit the utility of conventional static mixers for many applications, such as those where steady output pressure/volume and consistent/low internal temperatures are desired.

BRIEF SUMMARY OF THE INVENTION

The present disclosure provides a static mixer. The static mixer comprises a housing defining an internal mixing cavity that longitudinally extends along a central axis between an inlet and an outlet and is adapted for axial flow of a fluid therethrough. The static mixer also comprises a mixing element disposed within the mixing cavity. The mixing element comprises an elongated mixing blade that is oriented longitudinally within the mixing cavity and comprises a nose axially oriented toward the inlet. The mixing element is configured to be free from an impingement surface oriented substantially perpendicular to a main direction of fluid flow through the internal mixing cavity.

The present disclosure also provides the static mixer comprising a jacket disposed about the mixing cavity of the housing. The jacket may be integrally formed with the housing of the static mixer.

The present disclosure further provides a use of the static mixer.

The present disclosure also provides an additive manufacturing system. The additive manufacturing system comprises the static mixer.

These and other features and advantages of the present disclosure will become apparent from the following description of particular embodiments, when viewed in accordance with the accompanying drawings, examples, and appended claims.

BRIEF DESCRIPTION OF THE DRAWINGS

FIG. 1A-C shows various side and isometric views of one embodiment of a static mixer in accordance with the present disclosure;

FIG. 2A-B show face-on and profile views, respectively, of a mixing blade in accordance with one embodiment of the present disclosure;

FIG. 3 shows an isometric view of a helical mixing blade in accordance with one embodiment of the present disclosure;

FIG. 4 shows an isometric view of a corrugated mixing blade in accordance with one embodiment of the present disclosure;

FIG. 5A-B show isometric views of prismatic mixing blades in accordance with certain embodiments of the present disclosure;

FIGS. 19-21 show the results of a pressure-drop assessment of the static mixer of FIG. 18, as set forth in the Examples;

DETAILED DESCRIPTION OF THE INVENTION

Figure 6:
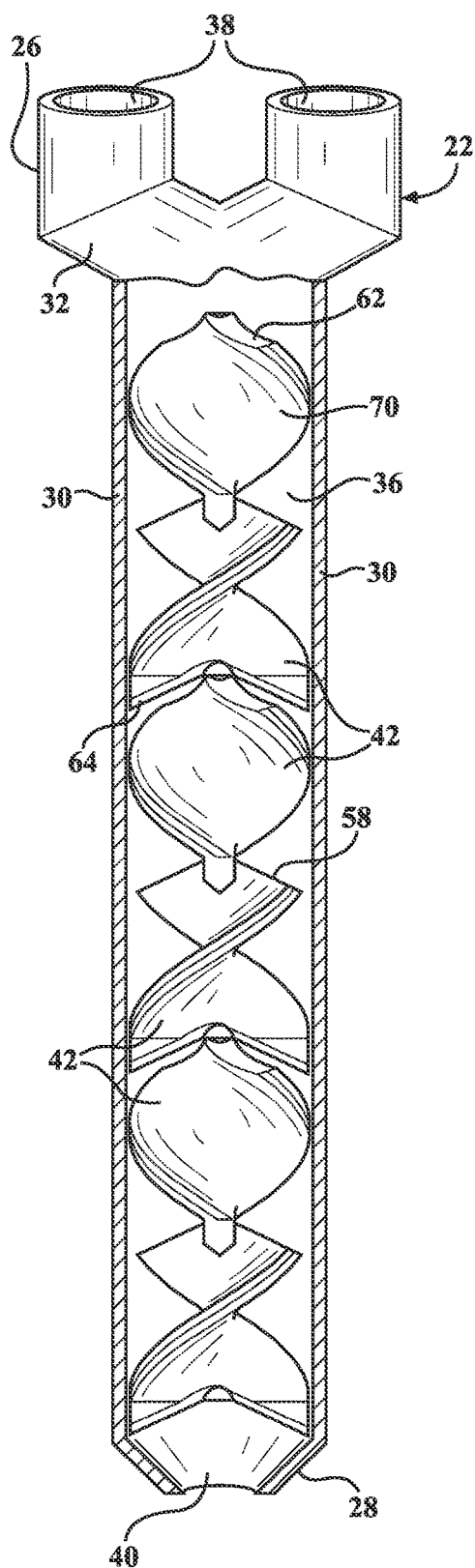
FIG. 6 shows a partial cutaway view of one embodiment of a static mixer comprising a series of helical mixing elements in accordance with the present disclosure.

A static mixer is provided herein. As will be appreciated from the description below, the static mixer provides a reduced pressure drop during operation, in turn providing increased start-stop control of the output of mixed/homogenized material prepared with the static mixer and increased energy efficiency. The static mixer may include an integral heat exchange jacket or other such temperature control elements, allowing for utility of the static mixer with respect to curable compositions and other applications sensitive to temperature and/or pressure variations. As will be apparent from the description below, the particular design and material composition of the static mixer, and the various components thereof, provide increased ease of production, novel utility, decreased manufacturing/maintenance costs, and expanded applications as compared to other static mixers. More specifically, the static mixer provides a maintained level of mixing with minimized pressure drop, and thus a minimized force and energy requirement to pump materials through the static mixer.

With reference to FIGS. 1-17, wherein like numerals indicate corresponding parts throughout the several views, the static mixer is illustrated and generally designated at 20. Certain features of the static mixer 20 are functional, but can be implemented in different aesthetic configurations. As will be appreciated from the exemplary embodiments herein, and as described in further detail below, the static mixer 20 may be monolithic in construction (i.e., comprise but one piece, or multiple pieces that are permanently joined together) or, alternatively, may comprise multiple pieces that are releasably, removeably, or semi-permanently coupled or connected together, such that the static mixer 20 may also be described or otherwise defined as a static mixer system 20, a static mixer apparatus 20, etc.

The static mixer 20 comprises a housing 22, which extends along a central axis 24 between a first end 26 and a second end 28. The housing 22 may be of any length, i.e., the first and second ends 26, 28 of the housing 22 may be separated by any distance along the central axis 24. For example, in some embodiments, the housing 22 is from 0.5 mm to 5000 cm in length, such as from 3 to 200, alternatively from 3 to 50, alternatively from 3 to 20 cm, in length.

The housing 22 generally includes a side wall 30 that extends between the first end 26 and the second end 28 and presents an exterior surface 32 and an interior surface 34. The exterior surface 32 and the interior surface 34 may be independently textured (e.g. dimpled, etc.) or untextured (e.g. smooth or substantially smooth), continuous (i.e., unbroken) or discontinuous (i.e., may comprise a vent, a port, a door, a window, or other such feature), or combinations thereof. In some embodiments, the interior surface 34 is continuous and substantially smooth. Typically, the side wall 30 comprises a single layer. However, while not shown in the figures, in some embodiments, the side wall 30 is multi-layered, and comprises at least an outer layer presenting the exterior surface 32 and an inner layer presenting the interior surface 34. In such embodiments, the housing 22 may comprise any number of intermediate layers disposed between the inner and outer layers thereof, and other components such as fillers (e.g. insulation), supports, etc. Accordingly, it is to be appreciated that the side wall 30 of the housing 22 may be of any thickness (i.e., the exterior surface 32 and the interior surface 34 may be spaced apart by any distance), such as from 0.05 to 50 cm. The shape of the side wall 30, and thus the housing 22, may vary, e.g. based on the intended use, the number of layers of the side wall 30, etc. For example, in some embodiments, the inner layer of the side wall 30 is substantially tubular in shape, such that a cross section of the inner layer taken perpendicular to the central axis 24 comprises a substantially circular shape. Accordingly, in some such embodiments where the side wall 30 is of a unitary construction (i.e., only comprises the single layer) the housing 22 itself is substantially tubular in shape. Likewise, in other such embodiments where the housing 22 is multi-layered, the outer layer may comprise substantially the same shape as the inner layer (e.g. such that the side wall 30 comprises concentric tubes), or may be different in shape from the inner layer.

The housing 22 may comprise any width, or number of different widths (i.e., exterior most portions of the exterior surface 32 opposite one another about the central axis 24 may be separated by any distance). For example, in certain embodiments, the housing 22 comprises a substantially consistent width as measured along the length of the housing 22 (e.g. where the housing 22 is substantially tubular in shape). In some embodiments, the width of the housing 22 varies, such that the housing 22 comprises multiple widths, which may be independently selected. As will be understood by one of skill in the art, the width(s) of the housing 22 may be determined by, or may determine, the overall shape of the housing 22. As such, the width of the housing 22 may be defined based on the shape thereof. For example, in embodiments where the housing 22 is substantially tubular in shape, the width of the housing 22 may be defined as an overall diameter thereof. In some embodiments, the housing 22 comprises a width of from 0.1 cm to 10 m, such as from 0.2 cm to 1 m, alternatively from 0.2 to 50 cm, alternatively from 0.3 to 20 cm. In certain embodiments, the housing 22 comprises a diameter/length ratio of from 0.01 to 2.

Regardless of the overall shape of the housing 22, the interior surface 34 of the side wall 30 defines an internal mixing cavity 36. In general, as will be understood in view of the embodiments described herein, the mixing cavity 36 is adapted for axial flow of a fluid therethrough. As such, the interior surface 34 defining the mixing cavity 36 may be bare or coated, e.g. to modify (i.e., increase/decrease) a property thereof, such as lubricity, chemical resistance, toughness, etc. The mixing cavity 36 may be of any dimensions, which may be independently selected by varying the shape, length, and/or width of the housing 22, the thickness of the side wall 30, the texture of the interior surface 34, etc. In certain embodiments, the mixing cavity 36 defines a volume of from 0.1 mm$^3$ to 10 m$^3$, such as from 1 mm$^3$ to 0.5 m$^3$, alternatively of from 1 mm$^3$ to 5000 cm$^3$, alternatively of from 2 mm$^3$ to 500 cm$^3$.

The housing 22 includes an inlet 38 proximal the first end 26 and an outlet 40 proximal the second end 28. In general, the inlet 38 and the outlet 40 are independently adapted for flow of a fluid into and out of, respectively, the mixing cavity 36 from outside of the housing 22. In particular, the inlet 38 is configured to facilitate introduction (i.e., ingress) of material into the mixing cavity 36, and the outlet 40 is configured to facilitate removal (i.e., egress) of material from the mixing cavity 36, as described in further detail below. As such, the inlet 38 and the outlet 40 each independently define a channel for passage of a fluid therethrough. The inlet 38 and the outlet 40 may be independently sized, shaped, and/or otherwise configured, and may be integral with, fixed to, and/or otherwise connected and/or fastened to the side wall 30 or another portion of the housing 22. In certain embodiments, the inlet 38 comprises an interior diameter of from 0.1 mm to 1 m. In these or other embodiments, the outlet 40 comprises an interior diameter of from 0.1 mm to 1 m. However, as will be understood by those of skill in the art, the diameter of the inlet 38 and the outlet 40 may be independently selected, e.g. to control the rate at which material is introduced to and/or removed from the mixing cavity 36 of the housing 22, respectively. As such, in some embodiments, the inlet 38 and/or the outlet 40 is variable in size. In certain embodiments, the housing includes at least two inlets 38, as shown with particularity in FIGS. 1 and 16, such that the static mixer 20 is adapted to receive at least two different materials to be mixed therewith. In such embodiments, each of the inlets 38 may be the same as or different from the other, e.g. with respect to connection type, diameter, feed source, etc. Of course, while not shown, any number of additional inlets 38, or an adapter for facilitating a plurality of different materials from different sources, may also be utilized.

The housing 22 may include additional components, which are not limited and may be selected by those of skill in the art, e.g. for maintaining, monitoring, determining, controlling, or affecting a condition of the housing 22 or a portion thereof (e.g. the mixing cavity 36), providing additional structure for a particular function, etc. For example, in some embodiments, the housing 22 includes a sensor (not shown), such as a pressure sensor, a temperature sensor, a level sensor, a flow sensor, a compositional sensor, etc., or a combination thereof. As will be appreciated by those of skill in the art, any number and/or kind of sensor(s) may be utilized. In certain embodiments, the housing 22 comprises an end cap (not shown) disposed at one, alternatively at each of, the first and second ends 26, 28. In such embodiments, each end cap is disposed adjacent the side wall 30 of the housing 22 at the first and/or second end 26, 28 thereof. Each end cap may independently be integrally formed with the side wall 30, fixed to the side wall 30 (e.g. via welds, etc.), and/or otherwise connected and/or fastened to the side wall 30 of the housing 22 (e.g. via bolts, adhesive, threaded-on relation, etc.). Each end cap is independently dimensioned, and may be of any length, width, thickness, shape, etc. For example, each end cap may be independently configured to conform to a particular geometric shape (e.g. a disc shape), and may be concave, convex, or substantially flat/planar. Additionally, each end cap may independently be continuous (i.e., unbroken) or may comprise a vent, a port, a door, a window, or other such features, or a combination thereof. For example, in some embodiments, the housing 22 comprises a first endcap (not shown) at the first end 26 that comprises or otherwise defines the inlet 38. In these or other embodiments, the housing 22 comprises a second endcap (not shown) at the second end 28 that comprises or otherwise defines the outlet 40.

It is to be appreciated that the configuration of the housing 22 is not particularly limited beyond the features and components, and the respective functions thereof, described herein. As such, the housing 22 may be adapted, configured, and/or modified, e.g. depending on an intended and/or desired use of the static mixer 20. For example, the static mixer 20 may be utilized as a vertical mixer or as a horizontal mixer. As such, in some embodiments, the housing 22 may be positioned such that the central axis 24 extends in a vertical or horizontal direction (i.e., is oriented substantially perpendicular to, or parallel to, respectively) a surface (e.g. the ground, a floor, a wall, etc.) upon which the static mixer 20 is utilized. In certain embodiments, however, the housing 22 may be arranged with the central axis 24 offset at an angle with respect to the surface upon which the static mixer 20 is utilized, such that the central axis 24 of the housing 22 is not parallel or perpendicular thereto.

The static mixer 20 comprises a mixing element 42 disposed within the mixing cavity 36 of the housing 22. As will be described in further detail below, the mixing element 42 is configured to be free from an impingement surface oriented substantially perpendicular to a main direction of fluid flow through the mixing cavity 36.

The mixing element 42 comprises an elongated mixing blade 44. In general, the mixing blade 44 is configured to cause a flow disturbance, e.g. via splitting and/or combining localized flow(s) of fluid in half, in order to homogenize two or more independent fluids flowing through the mixing cavity 36. As will be understood by those of skill in the art, such homogenization typically involves increased turbulence, and may involve and/or be characterized as mimicking the "Baker's transformation," i.e., repeatedly cutting, reorienting, and stacking material in the fluid to introduce striations into the flow.

As shown in FIG. 2, the mixing blade 44 typically comprises a body 46, which extends longitudinally between a nose portion 48 (i.e., the "nose 48") and a tail portion 50 (i.e., the "tail 50") and laterally between opposing lateral sides 52. The mixing blade 44 also typically comprises opposing faces 54 presented by the body 46 between opposing lateral edges 56 at the lateral sides 52. As described in further detail below, the mixing blade 44 is oriented longitudinally within the mixing cavity 36 of the housing 22 such that the nose 48 is axially oriented toward the inlet 38 and the tail 50 is axially oriented toward the outlet 40. As will be understood by those of skill in the art in view of this disclosure, the orientation of the mixing blade 44 within the mixing cavity 36 is such that a fluid passing through the mixing cavity 36 from the inlet 38 to the outlet 40 will flow adjacent the nose 48 of the mixing blade 44, which is configured to split the flow (e.g. bisect) such that the resulting flows traveling along opposite faces 54 presented by the body 46. Moreover, as introduced above, the mixing element 42 is configured to be free from an impingement surface oriented substantially perpendicular to a main direction of fluid flow through the mixing cavity 36. Accordingly, as will be appreciated in view of the description herein, the mixing blade 44, and each of the various components thereof, are independently and/or collectively configured to also to be free from such an impingement surface.

Typically, at least one, alternatively both, of the lateral edges 56 are disposed adjacent to the interior surface 34, optionally in sealed relation with the side wall 30, of the housing 22 at the lateral perimeter of the mixing cavity 36. However, while not shown, it is to be appreciated that certain portions of the lateral edges 56, such as a portion proximal the tail 50, may be spaced from the interior surface 34 to create a gap therebetween. In this configuration, fluid flowing through the gap between the lateral edge 56 and the interior surface 34 of the side wall 30 is subjected to a jetting effect, which, as will be understood by those of skill in the art, may reduce or eliminate dead zones at or proximal to the tail 50, provide increased mixing via a secondary circulation path and additional pressure and velocity variation along the mixing blade 44 (e.g. between the opposing faces 54), prevent material accumulation/sticking at the wall, and/or reduce or prevent hot spots (e.g. areas of increased temperature from friction, etc.) in the mixing cavity 36. Accordingly, in some embodiments, mixing blade 44 may comprise a width that varies (e.g. reduces) between the nose 48 and tail 50, such that the lateral sides 52 taper inwards toward the outlet 40.

The mixing blade 44 comprises a leading edge 58 at the nose 48. The leading edge 58 extends obliquely inward from one of the lateral sides 52 to an apex 60. More specifically, the leading edge 58 is oriented at an angle γ, also referred to herein as the "attack angle γ" or, more simple, the "attack angle", which describes the offset of the leading edge 58 from perpendicular with respect to the lateral side 52. For example, the angle γ may be measured at the apex 60 between the leading edge 58 and a plane perpendicular to a longitudinal axis of the mixing blade 44. In certain embodiments, the angle γ is measured at the apex 60 between the leading edge 58 of the mixing blade 44 and a radial plane (not shown) of the mixing cavity 36 at the apex 60. The angle γ is selected to be greater than 0 and less than 90 degrees, i.e., such that $0<\gamma<[\pi/2]$ radians. In some embodiments, the angle γ is from 5 to 85, alternatively from 10 to 80, alternatively from 15 to 75, alternatively from 20 to 70, alternatively from 25 to 65, degrees.

Typically, the leading edge 58 is outwardly tapered and comprises a pair of opposing front taper surfaces 62 that converge at an angle $\alpha^1$, also referred to herein as the "front taper angle $\alpha^1$" or "taper angle $\alpha^1$". As will be understood by those of skill in the art, the taper angle $\alpha^1$ is generally subtended by a thickness of the mixing blade 44 at the nose 48. The taper angle $\alpha^1$ is selected to be greater than 0 and less than 90 degrees, i.e., such that $0<\alpha^1<[\pi/2]$ radians. In some embodiments, the taper angle $\alpha^1$ is from 5 to 85, alternatively from 10 to 80, alternatively from 15 to 75, alternatively from 20 to 70, alternatively from 25 to 65, degrees.

In some embodiments, the mixing blade 44 comprises more than one of the leading edge 58 at the nose 48, such as a pair of leading edges 58 that converge at the apex 60. In such embodiments, each leading edge 58 may be independently selected and the same as or different from the other, e.g. with respect to the attack angle γ, the taper angle $\alpha^1$, etc. For example, in certain embodiments, the mixing blade 44 comprises a pair of complementary leading edges 58 that comprise substantially the same attack angle γ and taper angle $\alpha^1$.

The mixing blade 44 comprises a trailing edge 64 at the tail 50. The trailing edge 64 extends obliquely inward from one of the lateral sides 52 to a vertex 66. More specifically, the trailing edge 64 is oriented at an angle β, also referred to herein as the "release angle β" or, more simple, the "release angle", which describes the offset of the trailing edge 64 from perpendicular with respect to the lateral side 52. For example, the angle β may be measured at the vertex 66 between the trailing edge 64 and a plane perpendicular to a longitudinal axis of the mixing blade 44. In certain embodiments, the angle β is measured at the vertex 66 between the trailing edge 64 of the mixing blade 44 and a radial plane (not shown) of the mixing cavity 36 at the vertex 66. The angle β is selected to be greater than 0 and less than 90 degrees, i.e., such that $0<\beta<[\pi/2]$ radians. In some embodiments, the angle β is from 5 to 85, alternatively from 10 to 80, alternatively from 15 to 75, alternatively from 20 to 70, alternatively from 25 to 65, degrees.

Typically, the trailing edge 64 is outwardly tapered and comprises a pair of opposing rear taper surfaces 68 that converge at an angle $\alpha^2$, also referred to herein as the "rear taper angle $\alpha^2$" or "taper angle $\alpha^2$". As will be understood by those of skill in the art, the taper angle $\alpha^2$ is generally subtended by a thickness of the mixing blade 44 at the tail 50. The taper angle $\alpha^2$ is selected to be greater than 0 and less than 90 degrees, i.e., such that $0<\alpha^2<[\pi/2]$ radians. In some embodiments, the taper angle $\alpha^2$ is from 5 to 85, alternatively from 10 to 80, alternatively from 15 to 75, alternatively from 20 to 70, alternatively from 25 to 65, degrees.

In some embodiments, the mixing blade 44 comprises more than one of the trailing edge 64 at the tail 50, such as a pair of trailing edges 64 that converge at the vertex 66. In such embodiments, each trailing edge 64 may be independently selected and the same as or different from the other, e.g. with respect to the release angle β, the taper angle $\alpha^2$, etc. For example, in certain embodiments, the mixing blade 44 comprises a pair of complementary trailing edges 64 that comprise substantially the same attack angle β and taper angle $\alpha^2$. In particular embodiments, as shown in FIGS. 2-4, the mixing blade 44 comprises both the pair of complementary leading edges 58 and the pair of complementary trailing edges 64, such that the mixing blade 44 comprises an overall chevron-like profile when viewed face-on.

Aside from the features described above, the mixing blade 44 is not particularly limited with regard to dimensions, size, shape, material, etc., which will each be independently selected by those of skill in the art in view of the various embodiments shown and described herein. Typically, the mixing blade 44 is configured in view of the type of mixing element 42 to be utilized in the static mixer 20.

In certain embodiments, the mixing blade 44 is further defined as a helical mixing blade, which is shown generally at 70 in FIGS. 3 and 6-10. In such embodiments, the body 46 of the helical mixing blade 70 comprises a curved elongated chevron-shaped sheet describing a helical shape. The helical mixing blade 70 is typically axially symmetric, with the pair of opposing lateral edges 56 defined by the body 46 being disposed adjacent to, optionally in sealed relation with, the interior surface 34 of the housing 22. The nose 48 of the helical mixing blade 70 comprises a pair of the leading edges 58, which are radially opposed and outwardly-facing, with each of the leading edges 58 obliquely extending outward from one of the lateral edges 56 of the body 46 to converge at the apex 60. The tail 50 of the helical mixing blade 70 comprises a pair of the trailing edges 64, which are radially opposed and inwardly-facing, with each of the trailing edges 64 obliquely extending inward from one of the lateral edges 56 of the body 46 to converge at the vertex 66.

Typically, the helical mixing blade 70 is configured as a single-twist circular helix. i.e., comprises an angle of rotation of 180 degrees and a constant diameter and pitch. However, while not shown, other configurations may also be utilized, as will be understood by those of skill in the art. For example, in certain embodiments, the lateral sides 52 of the helical mixing blade 70 taper inwards toward the outlet 40, such that the helical mixing blade 70 comprises a degree of conicity (e.g. comprises a lateral diameter proximal the nose 48 greater than a lateral diameter proximal the tail 50, etc.). In certain embodiments, the helical mixing blade 70 is configured as a partial-twist helix, i.e., comprises an overall degree of rotation of less than 180 degrees, such as of 90 degrees, 120 degrees, etc.

The helical mixing blade 70 may comprise other dimensions that are variable (i.e., increasing and/or decreasing) along the length thereof, such as a variable pitch, a variable gradient of rotation angle, etc. For example, in certain embodiments, the helical mixing blade 70 comprises a uniform twist rate (e.g. of 0.5, 1, 1.5, or 2, as measured by number of turns per length) along the length thereof. In other embodiments, the helical mixing blade 70 may comprise 2, 3, 4 or more different twists rates along the length thereof. In certain embodiments, the helical mixing blade 70 comprises a length to diameter ratio of from 0.5 to 5, such as 0.75, 1, 1.5, or 2 (length:diameter). In certain embodiments, the helical mixing blade 70 comprises a central axis parallel to, optionally coaxial with, the central axis 24 of the housing 22. In other embodiments, the helical mixing blade 70 comprises a degree of skewness (i.e., a central axis inclined with respect to the central axis 24 of the housing 22.

Figure 7:
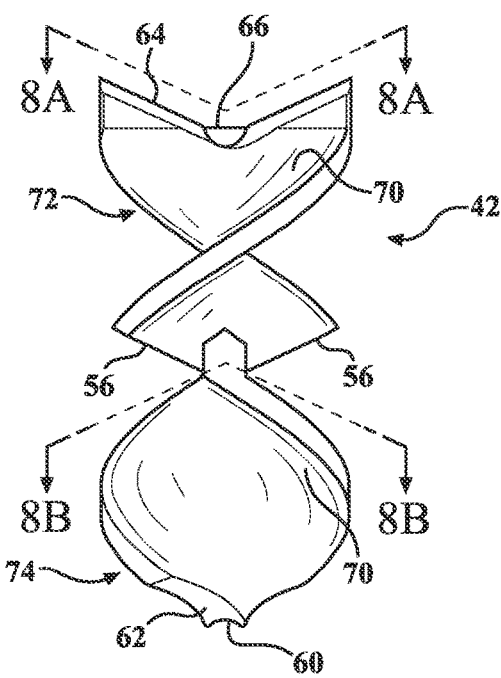
FIG. 7 shows an isometric view of a mixing element having a stack of helical mixing blades in accordance with one embodiment of the present disclosure.
Figure 8A:
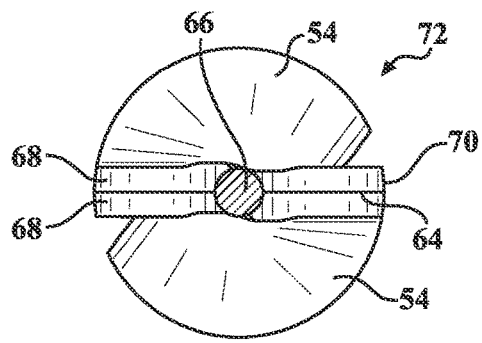
FIG. 8A shows a top-down view of a right-handed helical mixing blade taken from 8A-8A in FIG. 7.
Figure 8B:
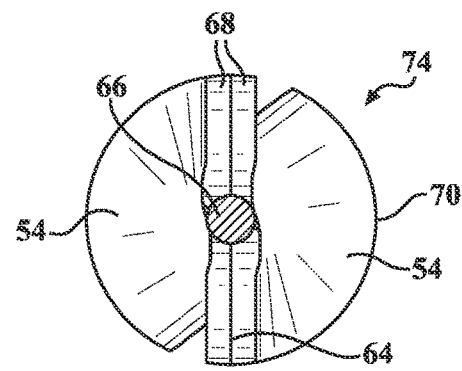
FIG. 8B shows a top-down view of a left-handed helical mixing blade taken from 8B-8B in FIG. 7.
Figure 9:
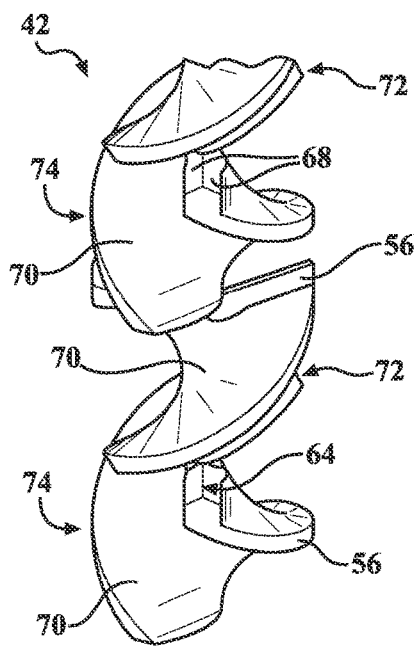
FIG. 9 shows a side perspective view of a series of mixing elements having helical mixing blades in accordance with one embodiment of the present disclosure.
Figure 10A:
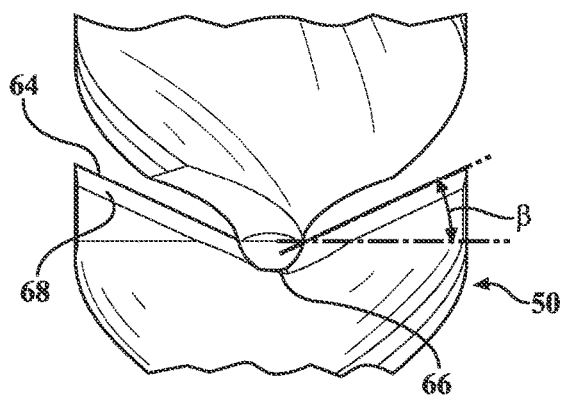
FIG. 10A-C show close-up isometric views of features of a helical mixing blade in accordance with one embodiment of the present disclosure.
Figure 10B:
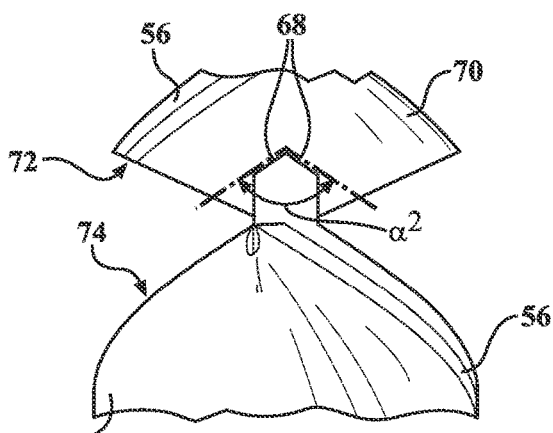
Figure 10C:
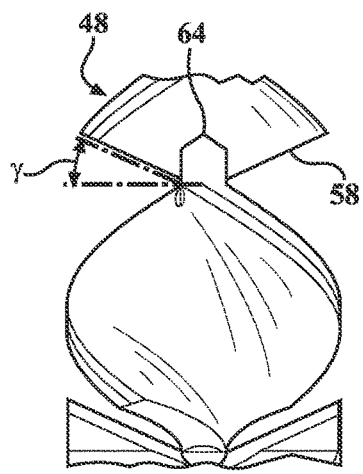

As shown more particularly in FIGS. 7 and 8, the helical mixing blade 70 may be configured as a right-hand/counter-clockwise winding helix (i.e., a right-hand helical mixing blade, shown at 72) or a left-hand/clockwise winding helix (i.e., a left-hand helical mixing blade, shown at 74). When multiple mixing blades 44 are utilized, as described in further detail below, the static mixer 20 may comprise both right and left-handed winding helical mixing blades 72, 74.

Figure 11:
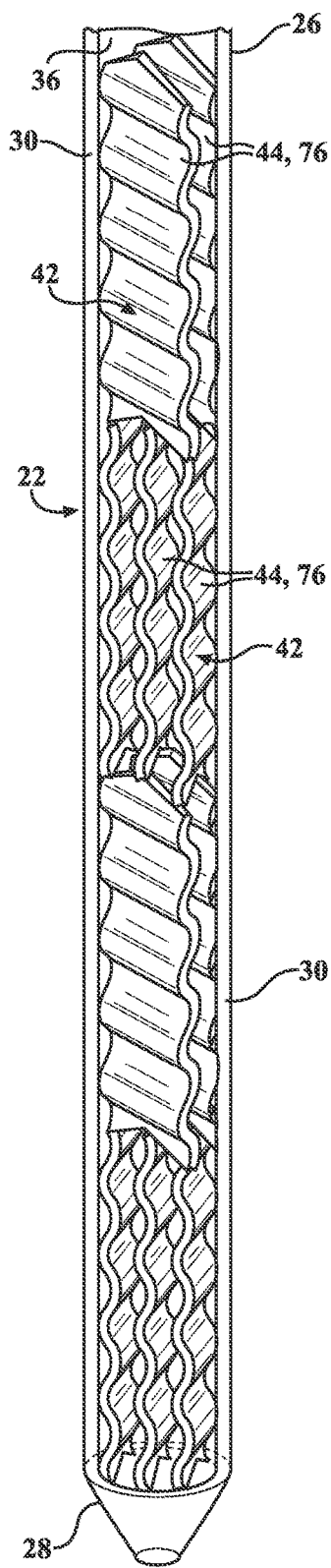
FIG. 11 shows a partial cutaway view of one embodiment of a static mixer comprising a series of alternating mixing elements comprising corrugated mixing blades in accordance with the present disclosure.
Figure 12:
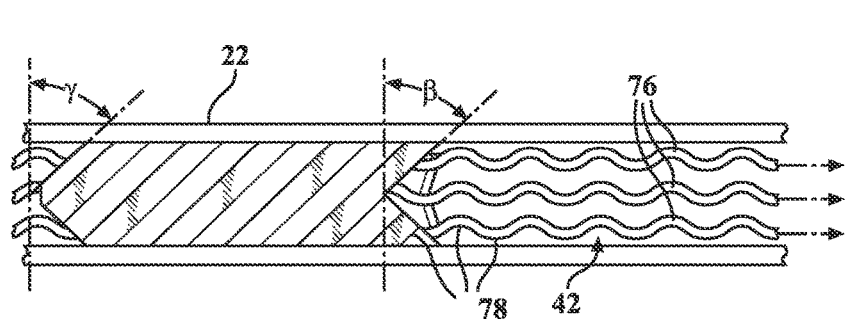
FIG. 12 shows a partial cutaway view of another embodiment of the static mixer comprising the series of alternating mixing elements comprising corrugated mixing blades in accordance with the present disclosure.

In certain embodiments, the mixing blade 44 is further defined as a corrugated mixing blade, which is shown generally at 76 in FIGS. 4, 11, and 12. In such embodiments, the body 46 of the corrugated mixing blade 76 comprises a generally planar elongated chevron-shaped sheet defining at least one, alternatively a plurality of, corrugations 78.

As shown, the nose 48 of the corrugated mixing blade 76 comprises a pair of the leading edges 58, which are radially opposed and outwardly-facing, with each of the leading edges 58 obliquely extending outward from one of the lateral edges 56 of the body 46 to converge at the apex 60. The tail 50 of the corrugated mixing blade 76 comprises a pair of the trailing edges 64, which are radially opposed and inwardly-facing, with each of the trailing edges 64 obliquely extending inward from one of the lateral edges 56 of the body 46 to converge at the vertex 66.

The corrugated mixing blade 76 typically comprises the pair of opposing lateral edges 56 defined by the body 46 disposed adjacent to, optionally in sealed relation with, the interior surface 34 of the housing 22. However, while not shown, other configurations may also be utilized, as will be understood by those of skill in the art in view of this disclosure. For example, in certain embodiments, the lateral sides 52 of the corrugated mixing blade 76 taper inwards toward the outlet 40, such that the width of the corrugated mixing blade 76 at the nose 48 is greater than the width at the tail 50. On other embodiments, the corrugated mixing blade 76 comprises a substantially constant width along the length of the body 46 (e.g. between the lateral edges 56).

The corrugations 78 comprise ridges 80 and/or valleys 82, and are otherwise not particularly limited. Typically, as will be understood by those of skill in the art, with respect to a single corrugation 78, the ridge 80 on one face 54 of the corrugated mixing blade 76 corresponds directly to a particular valley 82 on the opposing face 54. The ridges 80 and/or valleys 82 may be peaked, rounded, etc., and thus comprise a cross-sectional shape that is substantially triangular, ovoidal, etc. For example, the corrugations 78 may be V-shaped, W-shaped, U-shaped, etc. In certain embodiments, the corrugated mixing blade 76 comprises a series of substantially V-shaped corrugations 78 spaced along the body 46, the V-shaped corrugations comprising alternating ridges 80 and valleys 82. In other embodiments, the corrugated mixing blade 76 comprises a series of substantially W-shaped corrugations 78. The corrugations 78 are independently selected, and thus may be uniform (i.e., with each of the ridges 80 and/or valleys 82 the same as each other ridge 80 and/or valley 82) or different from one or each other, e.g. with regard to the shape and/or dimension (e.g. height, width, etc.) of any of the ridges 80 and/or valleys 82).

The number of individual corrugations 78 is not limited, and will be selected by those of skill in the art, e.g. in view of a desired orientation, width, etc. of each corrugation 78, the overall length, width, thickness, etc. of the corrugated mixing blade 76, etc. In certain embodiments, the corrugated mixing blade 76 comprises from 1 to 100, alternatively from 2 to 50, alternatively from 3 to 25, alternatively from 4 to 20, alternatively from 5 to 15 corrugations 78.

Each of the corrugations 78 typically extends along the entirely of the corrugated mixing blade 76, i.e., from one edge thereof to an opposing edge thereof. In this fashion, each valley 82 is adapted to guide/direct a local flow of fluid across the corrugated mixing blade 76. However, the corrugations 78 may be oriented in any direction, such as longitudinally to extend from the nose 48 to the tail 50 (e.g. parallel to the central axis of the corrugated mixing blade 76), transversely to extend from one to the other of the lateral sides 52 (e.g. perpendicular to the central axis of the corrugated mixing blade 76), or slantwise to extend across the body 46 at obliquely to the central axis of the corrugated mixing blade 76. For example, in certain embodiments, the corrugations 78 are offset from the central axis of the corrugated mixing blade 76 at an angle of from 0 to 90 degrees, such as from 15 to 75, alternatively from 30 to 60, alternatively of from 40 to 50, alternatively of 45 degrees.

The corrugations 78 may be spaced apart along the body 46 or, alternatively, may be positioned directly adjacent one another (e.g. to maximize the number of corrugations on the corrugated mixing blade 76). For example, one of the corrugations 78 may be separated from another by a distance of from 0.01 to 10 times the width of the one corrugation 78, such as a multiple of from 0.1 to 5, alternatively from 0.25 to 3, alternatively from 0.5 to 2, of the width, alternatively a distance the same as the width, of the one corrugation 78.

In certain embodiments, the mixing blade 44 is further defined as a prismatic mixing blade, which is shown generally at 84 in FIGS. 5 and 13-15. In such embodiments, the body 46 of the prismatic mixing blade 84 comprises a generally prismatic shape, such as a triangular prismatic shape.

As shown, the nose 48 of the prismatic mixing blade 84 comprises the leading edge 58 obliquely extending toward the inlet 38 from one of the lateral edges 56 of the body 46 to the apex 60. The tail 50 of the prismatic mixing blade 84 comprises the trailing edges 64 obliquely extending toward the inlet 38 from one of the lateral edge 56 of the body 46 to converge at the vertex 66. The leading edge 58 of the prismatic mixing blade 84 is tapered, with the front taper surfaces 62 extending inwardly toward the inlet 38 perpendicular to the leading edge 58 from the faces 54 to converge at the front taper angle $\alpha^1$. In certain embodiments, the prismatic mixing blade 84 comprises an elongated base 86. In certain embodiments, the front taper surfaces 62 extend from the base 86, such that the faces 54 and the front taper surfaces 62 are the same.

The prismatic mixing blade 84 is disposed within the mixing cavity 36 such that the body 46 is obliquely inclined to the central axis 24 of the housing 22. In this fashion, one of the lateral edges 56 of the prismatic mixing blade 84 is typically disposed adjacent to, optionally in sealed relation with, a portion of the interior surface 34 of the housing 22. The other of the lateral edges 56 may also be disposed adjacent to, optionally in sealed relation with, the interior surface 34 of the housing 22 (i.e., opposite the portion adjacent the opposing lateral edge 56). In some embodiments, the prismatic mixing blade 84 comprises a constant height and the leading edge 58 and the trailing edge 64 are substantially parallel to each other (i.e., the attack angle $\gamma$ and the release angle $\beta$ are the same). In these embodiments, the attack angle $\gamma$ and/or the release angle $\beta$ may also be referred to as the angle of inclination of the prismatic mixing blade 84. In other embodiments, however, the angle of inclination of prismatic mixing blade 84 may alternatively be defined as the angle at which the central axis of the prismatic mixing blade 84 is offset from parallel to the central axis 24 of the housing 22. In these embodiments, the prismatic mixing blade 84 typically comprises an angle of inclination of less than 90 degrees, such as from 15 to 75, alternatively from 30 to 60, alternatively of from 40 to 50, alternatively of 45 degrees.

However, in certain embodiments, one of the lateral edges 56 is spaced apart from the interior surface 34 of the side wall 30. In such embodiments, this lateral edge 56 may be obliquely inclined with respect to the central axis 24. For example, in certain embodiments, one of the lateral edges 56 is disposed in sealed relation with the side wall 30 of the housing 22, and the other of the lateral edges 56 extends inwardly from the base 86 to the apex 60, such that the other of the lateral edges 56 is the same is a second leading 58. In other embodiments, however, one of the lateral edges 56 is disposed in sealed relation with the side wall 30 and the other of the lateral edges 56 extends outwardly from the base 86 to the apex 60, such that the other of the lateral edges 56 is the same is a second trailing edge 64.

As introduced above, the mixing blade 44 is a component of the mixing element 42. In certain embodiments, the mixing element 42 consists essentially of, alternatively consists of, the mixing blade 44. In other embodiments, however, the mixing element 42 comprises more than one of the mixing blade 44 (i.e., a plurality of mixing blades 44). As will be understood by those of skill in the art in view of this disclosure, the mixing element 42 may comprise any number of mixing blades 44, which are independently selected and may be the same as or different from any other of the mixing blades 44 of the mixing element 42. For example, in certain embodiments, the mixing element 42 comprises from 2 to 100 of the mixing blades 44, such as from 2 to 50, alternatively from 2 to 35, alternatively from 2 to 30, alternatively from 2 to 25, alternatively from 5 to 25, alternatively from 5 to 20, alternatively from 10 to 20 of the mixing blades 44.

The mixing blades 44 of the mixing element 42 may be arranged in any order, e.g. based on the type(s) of mixing blade 44 utilized, the number of mixing blades 44 in the arrangement, etc. For example, in some embodiments, the mixing element 42 comprises a row of the mixing blades 44 disposed laterally across the mixing cavity 36, e.g. along a width or diameter thereof, tangentially to the diameter of the mixing cavity 36, etc. In such embodiments, the row may comprise at least 2, alternatively at least 3, alternatively at least 5 of the mixing blades 44. Each mixing blade 44 in the row adjoins at least one other mixing blade 44. In this fashion, the mixing blades 44 may each be in contact with or spaced apart from adjacent mixing blades 44 in the row. Moreover, each of the mixing blades 44 in the row may be disposed in the same or a different orientation with respect to one another, as described in further detail below. In some such embodiments, the mixing element 42 comprises more than one row, such as at least 2, alternatively at least 3, alternatively at least 5 rows of the mixing blades 44, which rows are each independently selected and may be the same as or different from any other of the rows (e.g. with regard to the number of mixing blades 44, the type(s) of mixing blades 44 utilized, the spacing between adjacent mixing blades 44, etc.).

In certain embodiments, the mixing element 42 comprises a stack of the mixing blades 44 disposed longitudinally within the mixing cavity 36, e.g. along a length thereof, along and/or coaxial to the central axis 24, etc. In such embodiments, the stack may comprise at least 2, alternatively at least 3, alternatively at least 5 of the mixing blades 44. Each mixing blade 44 in the stack adjoins at least one other mixing blade 44. In this fashion, the mixing blades 44 may each be in contact with or spaced apart from adjacent mixing blades 44 in the stack. Moreover, each of the mixing blades 44 in the stack may be disposed in the same or a different orientation with respect to one another, as described in further detail below. For example, in certain embodiments, the stack comprises at least 2 adjacent mixing blades 44 in axially offset, optionally axially orthogonal, relation to one another.

In some embodiments, the mixing element 42 comprises more than one stack, such as at least 2, alternatively at least 3, alternatively at least 5 stacks of the mixing blades 44, which are each independently selected and may be the same as or different from any other of the stacks (e.g. with regard to the number of mixing blades 44, the type(s) of mixing blade 44 utilized, the spacing between adjacent mixing blades 44, etc.).

As introduced above, the type, number, and/or arrangement of the mixing blades 44 in the mixing element 42 are independently selected. In particular embodiments, the mixing element 42 comprises a row of the corrugated mixing blades 76 described above. In such embodiments, each of the corrugated mixing blades 76 are disposed in parallel face-to-face spaced apart relation with respect to each other. The spacing is not particularly limited, but is generally selected such that adjacent corrugated mixing blades 76 present a gap between the outermost ends of the ridges 80 of the corrugations 78.

Figure 13:
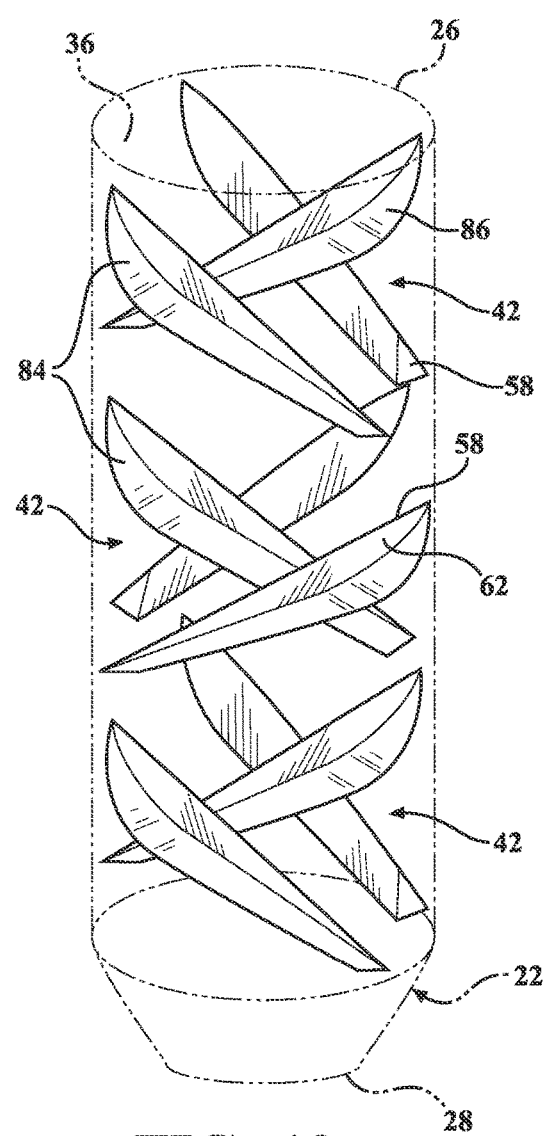
FIG. 13 shows a partial cutaway view of one embodiment of a static mixer comprising a mixing element having a row of transversely crossing prismatic mixing blades in accordance with the present disclosure.

In certain embodiments, as shown in FIGS. 11 and 13, adjoining corrugated mixing blades 76 in the row are selected with opposing corrugations, such that the direction of the corrugations 78 of one of the corrugated mixing blades 76 is not parallel to the direction of the corrugations 78 of any adjacent corrugated mixing blades 76 in the row. For example, in some such embodiments, each of the corrugated mixing blades 76 comprise corrugations 78 offset from the central axis 24 by 45 degrees, with the corrugated mixing blades 76 oriented such that the corrugations 78 of adjacent corrugated mixing blades 76 in the row extend perpendicular to each other. In other embodiments, the corrugated mixing blades 76 are oriented such that the corrugations 78 of adjacent corrugated mixing blades 76 in the row extend parallel to each other.

Figure 14:
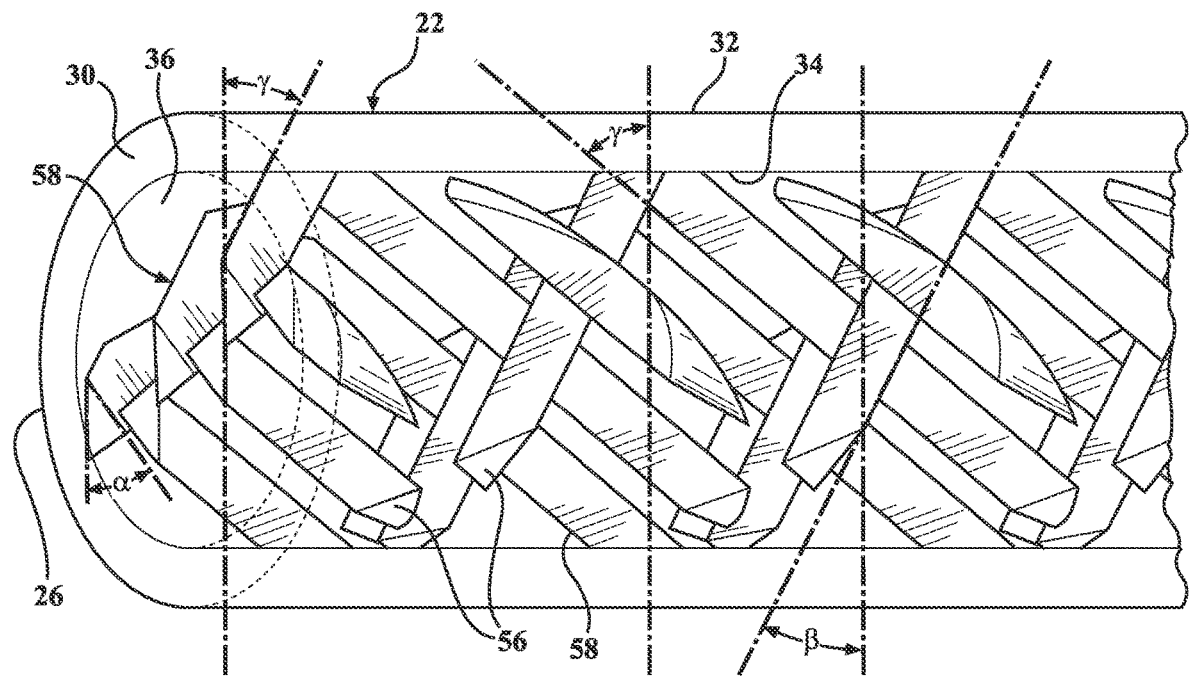
FIG. 14 shows a partial cutaway view of another embodiment of the static mixer comprising a mixing element having a row of transversely crossing prismatic mixing blades in accordance with the present disclosure.
Figure 15:
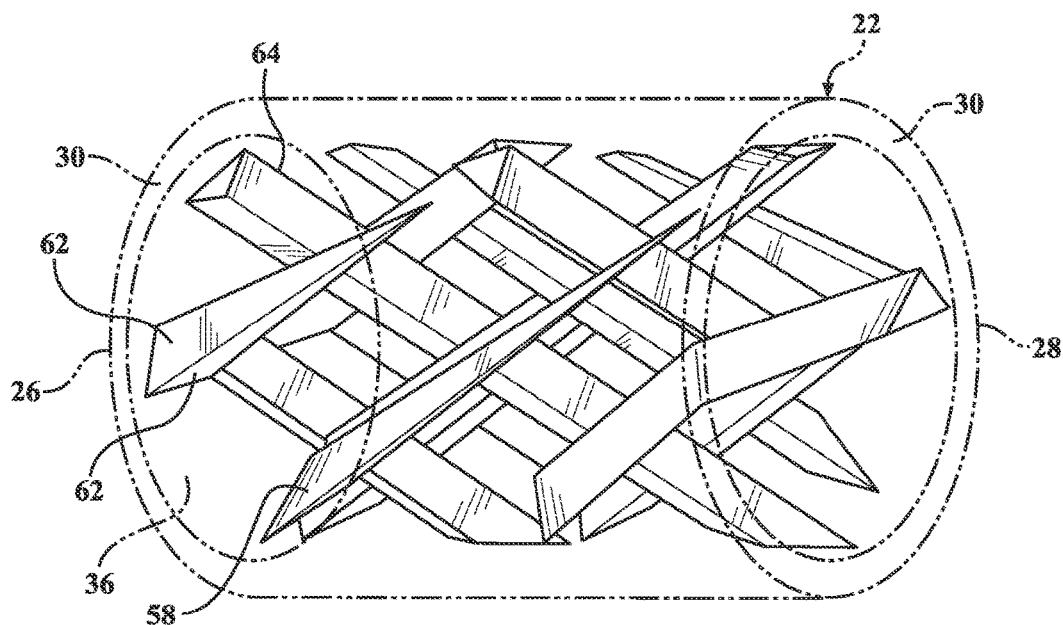
FIG. 15 shows a partial cutaway view of another embodiment of the static mixer comprising a mixing element having a row of transversely crossing prismatic mixing blades in accordance with the present disclosure.

In particular embodiments, as shown in FIGS. 13-15, the mixing element 42 comprises a row of the prismatic mixing blades 84 described above. In such embodiments, each of the prismatic mixing blades 84 are disposed in transversely spaced crossing relation with respect to each other. More particularly, each of the prismatic mixing blades 84 is obliquely inclined to the central axis 24, with adjoining prismatic mixing blades 84 alternating between two opposing directions of inclination in the row, such that each of the prismatic mixing blades 84 is arranged in transversely crossing relation to each adjacent prismatic mixing blade(s) 84 in the row. In such embodiments, the mixing element 42 comprises at least 2, alternatively at least 3, of the prismatic mixing blades 84 in the row, although more of the prismatic mixing blades 84 may be utilized. In certain embodiments, as shown in FIG. 15, the mixing element 42 comprises more than one of the rows of the prismatic mixing blades 84, such as 2, 3, 4, 5, or more of such rows. In such embodiments, each of the rows is typically spaced apart along the length of the mixing cavity 36. In some such embodiments, the mixing element 42 comprises a stack of the prismatic mixing blades 84. In some such embodiments, each of the prismatic mixing blades 84 in the stack is spaced apart and coaxial along the length of the mixing cavity 36 with adjacent prismatic mixing blades 84 in the stack. As such, one of skill in the art will appreciate that, in certain embodiments, the mixing element 42 comprises a stack of rows of the prismatic mixing blades 84, as shown in FIG. 14.

As introduced above, the mixing element 42 is a component of the static mixer 20. In certain embodiments, the static mixer comprises but one of the mixing element 42. In other embodiments, as shown in FIGS. 66, 11, and 13, the static mixer 20 comprises a plurality of the mixing elements 42 disposed in a series along the central axis 24 of the housing 22.

As will be understood by those of skill in the art in view of this disclosure, the series of mixing elements 42 may comprise any number of individual mixing elements 42, which are independently selected and may be the same as or different from any other of the mixing elements 42 in the series (e.g. with respect to type(s) of mixing blades utilized, etc.). For example, in certain embodiments, the static mixer 20 comprises a series of from 2 to 100 of the mixing elements 42, such as from 2 to 50, alternatively from 2 to 35, alternatively from 2 to 30, alternatively from 2 to 25, alternatively from 5 to 25, alternatively from 5 to 20, alternatively from 10 to 20 of the mixing elements 42.

Each of the mixing elements 42 in the series adjoins (i.e., is adjacent to, alternatively in contact with) at least one other mixing element 42. More particularly, as will be understood in view of the Figures, the mixing blades 44 of each mixing elements 42 in the series is adjacent the mixing blades 44 of another of the mixing elements 42 in the series. In this fashion, the mixing blades 44 may each be in contact with or spaced apart from the mixing blades 44 of adjacent mixing elements 42 in the series.

Each of the mixing elements 42 in the series may be disposed in the same or a different orientation with respect to one another, as described in further detail below. For example, in certain embodiments, the static mixer 20 comprises at least 2 adjacent mixing elements 42 in axially offset, optionally axially orthogonal, relation to one another. When axially offset, one of the mixing elements 42 may be rotationally offset from another by any amount, such as by 45, 90, or 180 degrees, or various other amounts therebetween. For example, in some embodiments, one of the mixing elements 42 may be rotationally offset from another of the mixing elements 42 in the series by an amount of from 5 to 90 degrees, such as from 15 to 75, alternatively from 30 to 60, alternatively of from 40 to 50 degrees. In other embodiments, one of the mixing elements 42 may be rotationally offset from another of the mixing elements 42 in the series by an amount of from 95 to 180 degrees, such as from 100 to 170, alternatively from 110 to 160, alternatively of from 120 to 150 degrees.

In some embodiments, as shown in FIGS. 6, the static mixer 20 comprises a series of mixing elements 42 each comprising but one of the helical mixing blade 70. In such embodiments, the mixing elements 42 are selected such that adjacent mixing elements 42 in the series alternate between comprising the right and left-handed winding helical mixing blades 72, 74. The mixing elements 42 are disposed in the series such that the helical mixing blades 70 of each adjoining/adjacent mixing element 42 are disposed nose-to-tail (i.e., nose 48 to tail 50) within the mixing cavity 36. In some such embodiments, the mixing elements 42 in the series are rotationally offset from each adjacent mixing elements 42, such as by 45, 60, 75, or 90 degrees. While not shown, the mixing elements 42 of the series need not be touching one another, but may instead be spaced apart along the length of the mixing cavity 36.

In certain embodiments, as shown in FIGS. 11-12, the static mixer 20 comprises a series of mixing elements 42 each comprising a row of the corrugated mixing blades 76. In such embodiments, the mixing elements 42 are disposed in the series such that the corrugated mixing blades 76 of each adjoining/adjacent mixing element 42 are disposed nose-to-tail (i.e., nose 48 to tail 50) within the mixing cavity 36. Typically, the mixing elements 42 in the series are rotationally offset from each adjacent mixing elements 42, such as by 45, 60, 75, or 90 degrees. Additionally, while not shown, the mixing elements 42 of the series need not be touching one another, but may instead be spaced apart along the length of the mixing cavity 36.

In particular embodiments, as shown in FIG. 13, the static mixer 20 comprises a series of mixing elements 42 each comprising a row of the prismatic mixing blades 84. In such embodiments, the mixing elements 42 are disposed in the mixing cavity 36 such that the mixing elements 42 in the series are rotationally offset from each adjacent mixing element 42, such as by 45, 60, 75, or 90 degrees. Additionally, the mixing elements 42 of the series need not be touching one another, but may instead be spaced apart along the length of the mixing cavity 36.

In certain embodiments, the static mixer 20 may comprise one or more temperature control units. While not shown, such temperature control units may be provided as an integral component of the static mixer 20 and/or as an auxiliary component coupled/attached to the static mixer 20 or another device operatively coupled thereto, such as any of those described in further detail below. Suitable temperature control units may comprise, alternatively may be, a heating element, a cooling element, and/or an insulating element, each of which may be active or passive. For example, active heating and/or cooling can be achieved by way of fluid convection, electrical or thermoelectrical means, or by phase change of materials at a particular range of temperatures.

Insulating elements typically comprise thermally insulating materials, such as polymer foams, nano-foams, sol-gel materials, stone wools, and the like, or combinations thereof, or vacuum chambers or other such structural features known to slow and/or control heat transport. In particular embodiments, illustrated by those shown in FIGS. 1 and 16, the static mixer 20 comprises the temperature control unit configured as a jacket 88 disposed about the mixing cavity 36 of the housing 22. In general, the jacket 88 defines a chamber 90 in fluid communication with the housing 22, and is adapted to act as a heat exchanger to the side wall 30, e.g. to control the temperature of mixing cavity 36.

The chamber 90 is not particularly limited, and may be configured with any shape, size, and/or dimensions suitable for the use and applications described herein. As shown with particularity in FIG. 16B, in certain embodiments, the chamber 90 is substantially tubular in shape, and configured as a tubular coil 96 disposed about (e.g. coiled around) the mixing cavity 36. In such embodiments, the coil 96 is typically coaxial with the mixing cavity 36, and thus generally shares the central axis 24. While but a single coil 96 is show, the chamber 90 may comprise multiple coils 96 of varying diameter, such that the chamber 90 may be configured as a dual-layer coil (not shown) comprising an inner coil (e.g. such as that shown as the tubular coil 96) disposed about/coiled around the mixing cavity 36, and an outer coil disposed about/coiled around the inner coil. One of skill in the art will appreciate that the chamber 90 is not limited to the tubular configuration described above, but may instead by implemented in any other configuration suitable for heat-exchanging with the mixing cavity 36. For example, in certain embodiments, the chamber 90 is configured as a continuous and open space surrounding the mixing cavity 36.

The jacket 88 typically comprises inlet port 92 and outlet port 94, which are independently adapted for flow of a heating and/or cooling agent (e.g. air, a coolant/refrigerant, a warm or hot fluid such as water, etc.) into and out of, respectively, the chamber 90 from outside of the jacket 88. In particular, the inlet port 92 is configured to facilitate introduction (i.e., ingress) of the heating and/or cooling agent into the chamber 90, and the outlet port 94 is configured to facilitate removal (i.e., egress) of the heating and/or cooling agent from the mixing chamber 90. As such, the inlet port 92 and the outlet port 94 each independently define a channel for passage of the heating and/or cooling agent therethrough. The inlet port 92 and the outlet port 94 may be independently sized, shaped, and/or otherwise configured, and may be integral with, fixed to, and/or otherwise connected and/or fastened to the jacket 88. As will be understood by those of skill in the art, the diameter of the chamber 90, inlet port 92, and outlet port 94 may be independently selected, e.g. to control the rate at which material is introduced to and/or removed from the chamber 90 of the jacket 88, respectively. In some embodiments, the inlet port 92 and/or the outlet port 94 are variable in size. Moreover, it is also to be appreciated that the chamber 90 may be unidirectional or bidirectional, such that, in some embodiments, the outlet port 94 may be used as an inlet for the heating and/or cooling agent and the inlet port 92 may be used as an outlet for the heating and/or cooling agent.

Figure 16A:
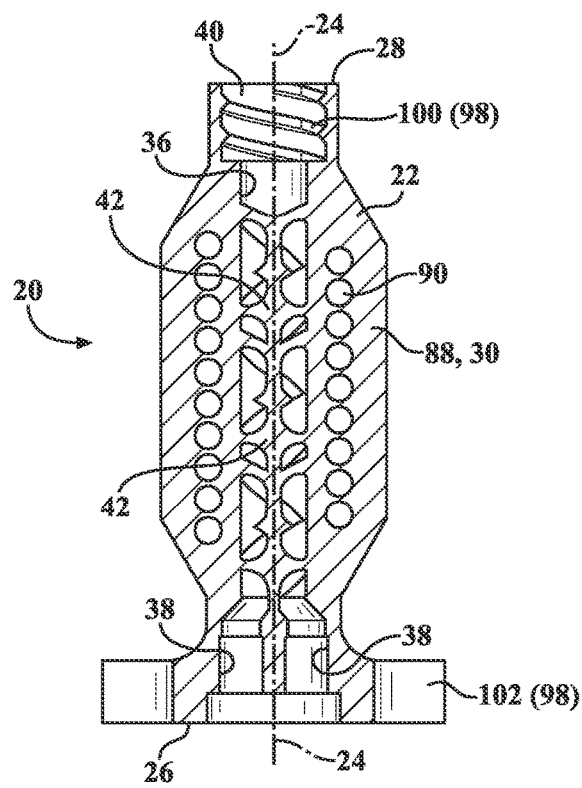
FIG. 16A shows a cut away view of a static mixer comprising an integrated cooling jacket and integrated mixing elements in accordance with one embodiment of the present disclosure.
Figure 16B:
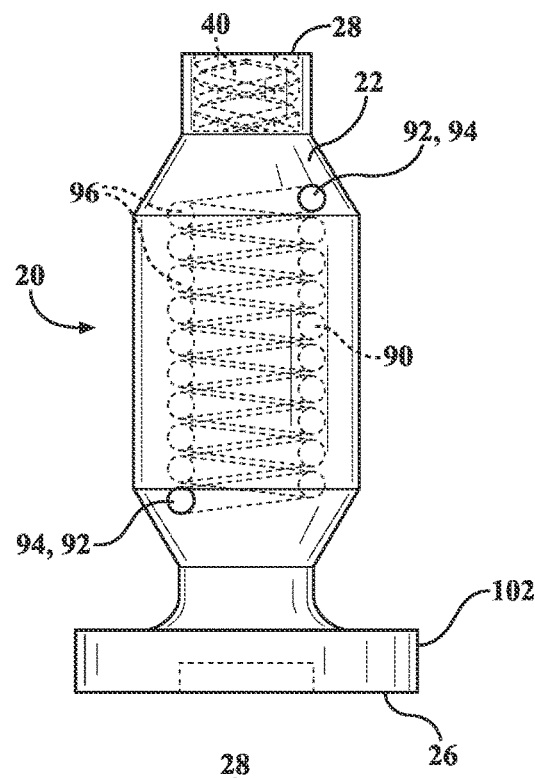
FIG. 16B shows an x-ray view of the static mixer of FIG. 16A showing a coiled chamber of the cooling jacket.
Figure 16C:
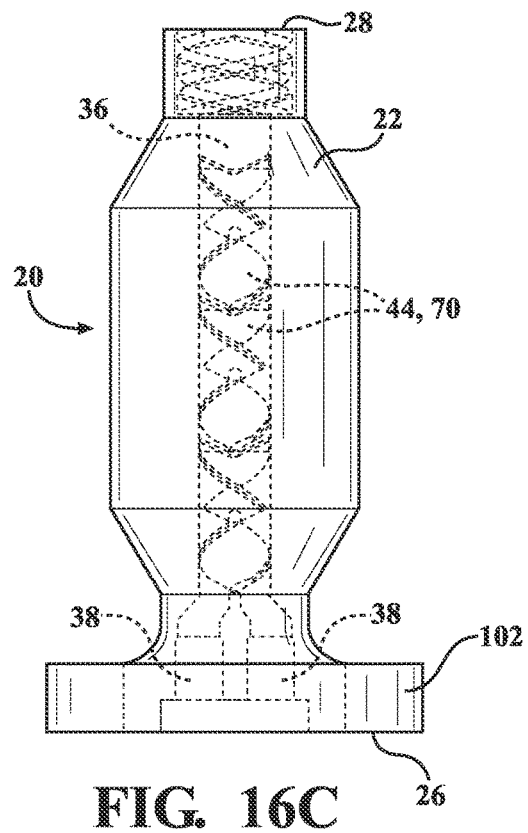
FIG. 16C shows an x-ray view of the static mixer of FIGS. 16A-B showing only the mixing elements.
Figure 16D:
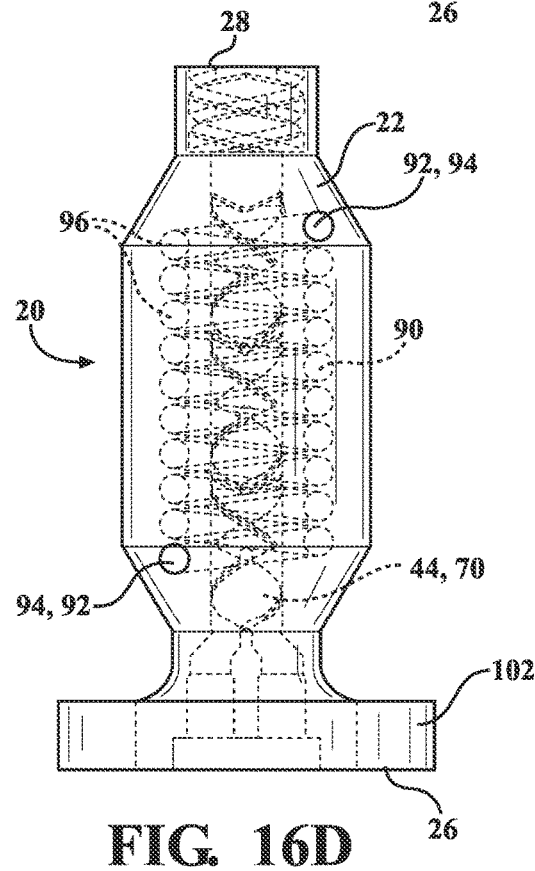
FIG. 16D shows an x-ray view of the static mixer of FIGS. 16A-C showing both the mixing elements and the cooling jacket together.

In certain embodiments, as shown with particularity in FIG. 16A, the jacket 88 is monolithic in construction with the housing 22. For example, in come such embodiments, the side wall 30 of the housing 22 defines the chamber 90 and, optionally, the inlet and outlet ports 92, 94.

In addition to the jacket 88, the housing 22 may comprise any additional components and/or structure, such as connection means 98 for securing additional components to the first end 26 and/or the second end 28. For example, as shown in FIG. 1, in certain embodiments, the housing 22 comprises connection means 98 at both the second end 28 (e.g. illustrated as threads 100 at the outlet 42) and the first end 26 (e.g. illustrated as connection plate 102 defining bolt holes 104). Suitable connection means include fasteners (e.g. threaded fasteners such as bolts, screws, etc., push fasteners, clamp fasteners, etc.) connectors (e.g. quick connectors, threaded connectors/connections, etc.), couplings (e.g. male-female couplings, press-couplings, etc.) clamps, adhesives, and the like, as well as various combinations thereof.

With regard to the static mixer 20 as a whole (i.e., not limited by particular configuration), the various components, and elements of such components, of the static mixer 20 described above (e.g. the housing 22, the mixing elements 42, the jacket 88, etc.) may be manufactured of the same or different material(s), such as any one or more of the materials described below. For example, in certain embodiments, the housing 22 is monolithic in construction and substantially homogeneous in composition (e.g. such that the side wall 30, inlet 38, and outlet 40 are integrally formed and/or formed of a single piece of material). In these or other embodiments, the jacket 88 and the housing 22 are monolithic in construction, as described above, and may independently comprise the same or different material as each other.

For example, in certain embodiments, each of the mixing blades 44 is monolithic in construction and substantially homogeneous in composition, and may independently comprise the same or different material as the housing 22 and/or the jacket 88. In these or other embodiments, each row and/or stack of the mixing blades 44 is monolithic in construction and, optionally, substantially homogeneous in composition. In certain embodiments, each mixing element 42 is monolithic in construction and, optionally, substantially homogeneous in composition, and may comprise the same or different material as the housing 22 and/or the jacket 88. In some such embodiments, the static mixer 20 comprises the series of the mixing elements 42, with the series being monolithic in construction and, optionally, substantially homogeneous in composition. In particular embodiments, the mixing element 42, alternatively the series of mixing elements 42, and the housing 22 are monolithic in construction and, optionally, substantially homogeneous in composition. In some such embodiments, the housing 22, jacket 88, and the mixing element 42, alternatively the series of mixing elements 42, are monolithic in construction and, optionally, substantially homogeneous in composition.

Notwithstanding the embodiments above, the housing 22, jacket 88, and mixing element(s) 42 may each independently comprise multiple components of varying compositions joined together (e.g. via permanent, semi-permanent, or non-permanent connections). Moreover, each component may itself comprise a combination of different materials, and thus may not comprise a homogeneous composition throughout. For example, the mixing blades 44 need not be the same in material composition as the side wall 30, but nonetheless may be joined together and/or integrally formed therewith.

Materials suitable for use in or as the static mixer 20, or one or more of the components thereof (e.g. the housing 22, jacket 88, mixing element(s) 42, and the various portions/components thereof, such as the mixing blades 44) include metals (e.g. steels, aluminums, magnesium, zinc, nickel, titanium, alloys, etc.), resins (e.g. thermoset and/or thermoplastic resins, such as epoxy, silicone, acrylic, urethane, bismaleimide, phenolics, vinyl esters, cyanate esters, polyamide, polyimide, polypropylene, polyethylene, polyester, etc.) and other polymeric materials, ceramics, and combinations thereof. However, myriad materials may be used to manufacture the components and elements of the static mixer 20, such as any of those described below, with each typically being selected as a function of availability, cost, performance/end use applications, etc. As such, metals, metal alloys, and resins are not exhaustive of suitable materials that may be used. Additionally, it is to be appreciated a surface or portion thereof of a particular component of the static mixer 20 may be coated, painted, and/or impregnated with a material having desired characteristics including, but not limited to, those described above or below. Moreover, one of skill in the art will readily appreciate that particular materials will be selected based on the features and/or functions of the static mixer 20 or particular components thereof. For example, one of skill in the art will understand that the composition and construction of, for example, the mixing blades 44 will control the resiliency of these elements, e.g. with respect to the force such elements may tolerate before deflecting, bending, breaking, etc.

In various embodiments, the static mixer 20 comprises a resin or other such polymeric material. In some such embodiments, the housing 22, the mixing element(s) 42, and the jacket 88 (if present) each comprise a resin, which may be the same as or different from the resin of the other component(s). Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

In some embodiments, the resin is selected from thermoset resins and thermoplastic resins. Examples of suitable thermoset and/or thermoplastic resins typically include polyamides (PA), such as Nylons; polyesters such as polyethylene terephthalates (PET), polybutylene terephthalates (PBT), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM) such as acetal homopolymer; polycarbonates (PC); polymethylmethacrylates (PMMA); polyvinyl chlorides (PVC); polyphenylene sulfides (PPS); polyphenylene oxide (PPO), polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; epoxy resins, urea-type (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof. Particular resins will be selected by those of skill in the art, e.g. based on material to be mixed, environment in which the static mixer 20 is to be used, the manufacturing method(s) and/or technique(s) selected to prepare the static mixer 20, etc. For example, in certain embodiments, the static mixer 20 is prepared via additive manufacturing utilizing a material selected from epoxy resins, urethane resins, urethane thermoplastic elastomers, urethane acrylates, and/or UV curable polymers or precursors thereof.

In certain embodiments, the static mixer 20, or one or more of the components thereof (e.g. the housing 22, the mixing element(s) 42, the jacket 88 (if present), and the various portions/components thereof, such as the mixing blades 44) is formed via an additive manufacturing (AM) process. Various particular processes are described below, including particular methods and materials that may be utilized, independently or collectively, in or as the AM process to form the static mixer 20, or one or more of the components thereof.

Any AM process may be utilized to form the static mixer 20, or one or more of the components thereof. In general, AM processes, such as 3D-printing, are typically referred to or classified based on a particular class of 3D printer utilized in the 3D printing process. Examples of these specific types of 3D printing processes include direct extrusion additive manufacturing, liquid additive manufacturing, fused filament fabrication, fused deposition modeling, direct ink deposition, material jetting, polyjetting, syringe extrusion, laser sintering, laser melting, stereolithography, powder bedding (binder jetting), electron beam melting, laminated object manufacturing, laser powder forming, ink-jetting, and the like. Such processes may be used independently or in combination in the method of this disclosure. 3D printers include extrusion additive manufacturing printers, liquid additive manufacturing printers, fused filament fabrication printers, fused deposition modeling printers, direct ink deposition printers, selective laser sintering printers, selective laser melting printers, stereolithography printers, powder bed (binder jet) printers, material jet printers, direct metal laser sintering printers, electron beam melting printers, laminated object manufacturing deposition printers, directed energy deposition printers, laser powder forming printers, polyjet printers, ink-jetting printers, material jetting printers, and syringe extrusion printers.

As described above, in certain embodiments, one or more components of the static mixer 20 may be monolithic in construction and substantially homogeneous in composition. In such embodiments, these one or more components may be formed as a unitary construction in a single AM process. However, each component of the static mixer 20 may be independently formed, using the same or different AM process, and subsequently assembled and/or fused/coupled/connected together to prepare the static mixer 20. For example, in some embodiments, each of the mixing blades 44 is formed via the AM process. In these or other embodiments, each row and/or stack of the mixing blades 44, alternatively each mixing element 42, alternatively the series of mixing elements 42 as a whole, is formed via the AM process, e.g. as a single construction or as individual pieces that are subsequently assembled together. In certain embodiments, the housing 22 and the jacket 88 are formed via the AM process, e.g. as a single construction or as individual pieces that are subsequently assembled together. In particular embodiments, the entire static mixer 20, comprising the housing 22, mixing element 42 or series of mixing elements 42, and jacket 88 is formed via the AM process. In some such embodiments, the static mixer 20 is formed as individual pieces/components, which are subsequently assembled and/or fused/coupled/connected together to prepare the static mixer 20. In other of such embodiments, the static mixer 20 is formed via the AM process as a single construction. Of course, one of skill in the art will readily appreciate that post-formation processing steps (e.g. surface treatments, shaping, tapping, threading, sanding, etc.) may be utilized, regardless of whether the static mixer 20 is formed as an assembly of a single, unitary construction. As will be understood by those of skill in the art in view of this disclosure, different AM methods are suitable for preparing the static mixer 20 and/or particular features thereof. For example, when a monolithic construction, intricate shape(s), and/or small size(s) are desired, stereolithography (SLA), digital light projection (DLP), and variations thereof, as well as methods utilizing two-photon polymerization methods, may be used.

Notably, the static mixer 20 provides for reduced pressure drop during use, resulting in a smoother and/or more controllable flow of fluid through the mixing cavity 36 compared to conventional static mixers, as evidenced by the Examples herein, as described in further detail below. This reduced drop in pressure allows for increased functionality, such as when mixing two-part reactive compositions. For example, uniformly mixing of two-part silicones is critical for silicone extrusion additive manufacturing (SEAM). As such, conventional static mixers are frequently employed due to high mixing efficiency. However, such conventional static mixers comprise a pressure that occurs from the mixing process, which results in delayed output and over/under dispensing of silicone. This variability undermines the over and under deposition of silicone, which is a primary benefit of SEAM, leading to frustration of purpose, part defects, or outright failure. The inventive static mixer comprises a significantly decreased over-extrusion rate and consistency, owing to a reduced pressure need due to the improved design of the mixing elements 42.

The static mixer 20 may be used to mix a variety of different materials, which may be fluids, suspensions, emulsions, etc. Examples of particular uses of the static mixer 20 include mixing reactants upstream of (i.e., in line and in front of) a chemical reactor, temperature homogenization of fluids before and/or after a source of heating or cooling (e.g. the temperature control unit and/or a heating and/or cooling element thereof), homogenizing of fluids with additives, initiating a curing reaction of a multi-component curable system, etc.

In certain embodiments, the static mixer 20 is used to mix, alternatively to homogenize, at least two different fluids. Fluids suitable for use in the mixing method are not specifically limited, and may be in liquid or gas form. As such, it is to be appreciated that a source of a fluid is typically in fluid communication with the inlet 38 during use. In certain embodiments, the inlet 38 is in fluid communication with one or more sources of liquid and/or gas reactants, heated or cooled liquid and/or gas, additives, etc.

A method of homogenizing at least two different fluids (i.e., the "mixing method") using the static mixer 20 is also provided. The mixing method comprises flowing the fluids simultaneously though the mixing cavity 36 of the static mixer 20, thereby homogenizing the fluids. In certain embodiments, the mixing method further comprises cooling the mixing cavity 36 via the jacket 88 (e.g. by passing a coolant through the chamber 90).

Figure 17:
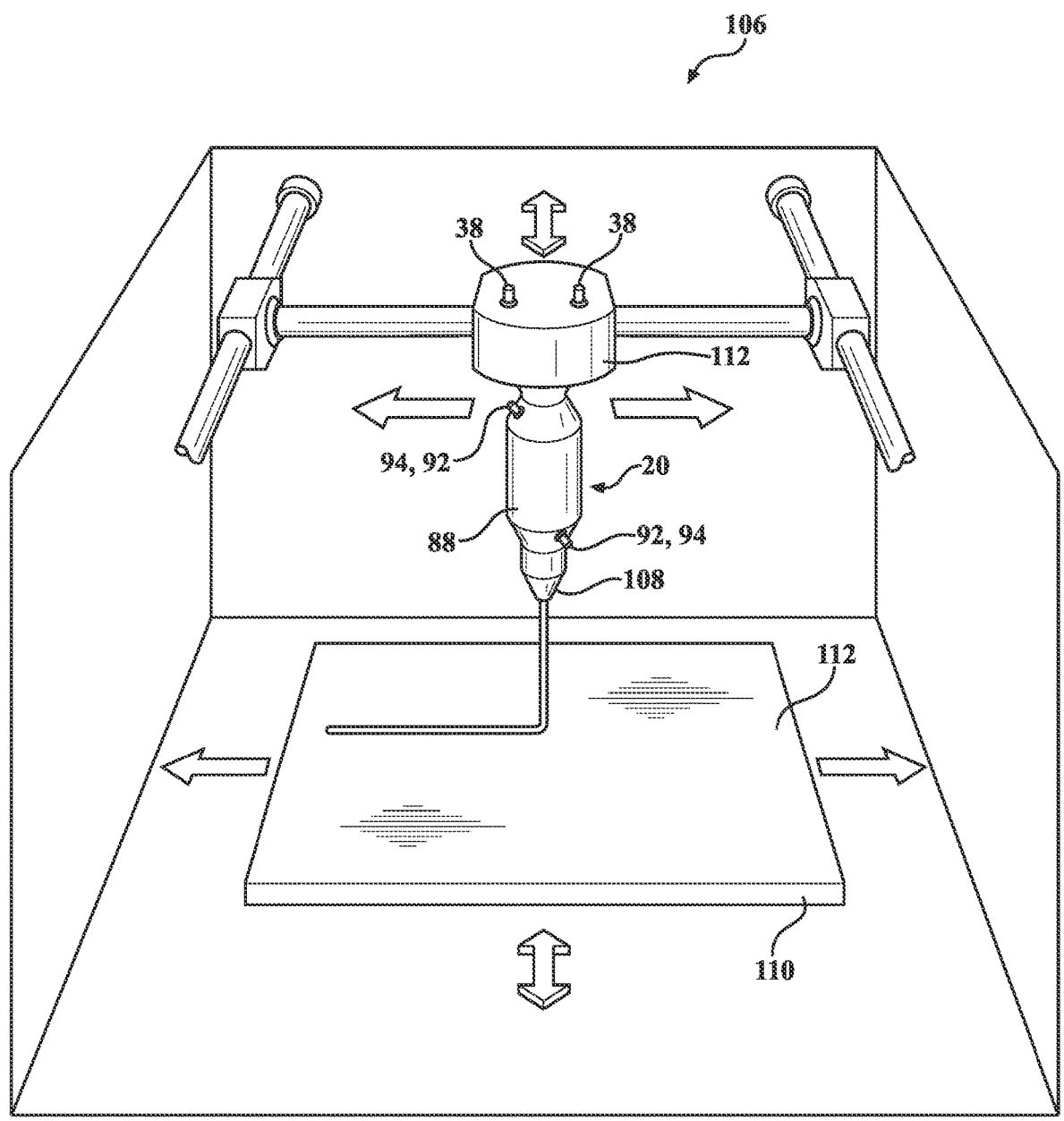
FIG. 17 shows a perspective view of an additive manufacturing system in accordance with one embodiment of the present disclosure.

An additive manufacturing system comprising the static mixer 20 is also provided, and is shown generally at 106 in the embodiment of FIG. 17 by way of example. As shown, the additive manufacturing system 106 (i.e., the "AM system 106") generally comprises the static mixer 20 and a nozzle 108 operatively coupled to the housing 22 (e.g. via connection means 98) at the second end 28 such that the nozzle 108 is in fluid communication with the mixing cavity 36 via the outlet 40. In certain embodiments, the AM system 106 further comprises a platform 110 and/or a head 112, which each may independently be moveable in any direction with respect to the other and/or an article being prepared during use.

While illustrated by the embodiments above, it is to be appreciated that the AM system 106 may be/include any apparatus comprising the static mixer 20 and a nozzle (e.g. the nozzle 108) from which a composition may be dispensed. For example, the outlet 40 itself may be adapted for use as the nozzle 108. As such, the AM system 106 may be a 3D printer, or any other such apparatus capable of dispensing a material for building 3D articles, which are generally referred to or encompassed by the scope of a 3D printer.

Figure 24A:
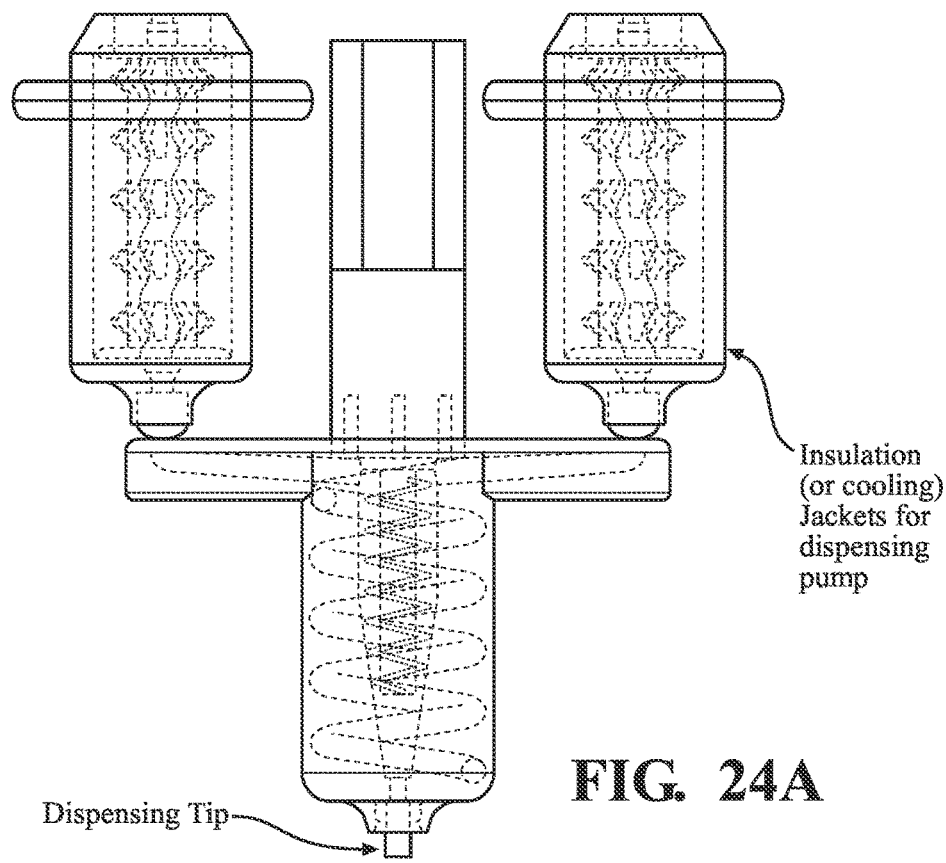
FIG. 24A is an active mixing unit including a cooling jacket as a temperature control unit.
Figure 24B:
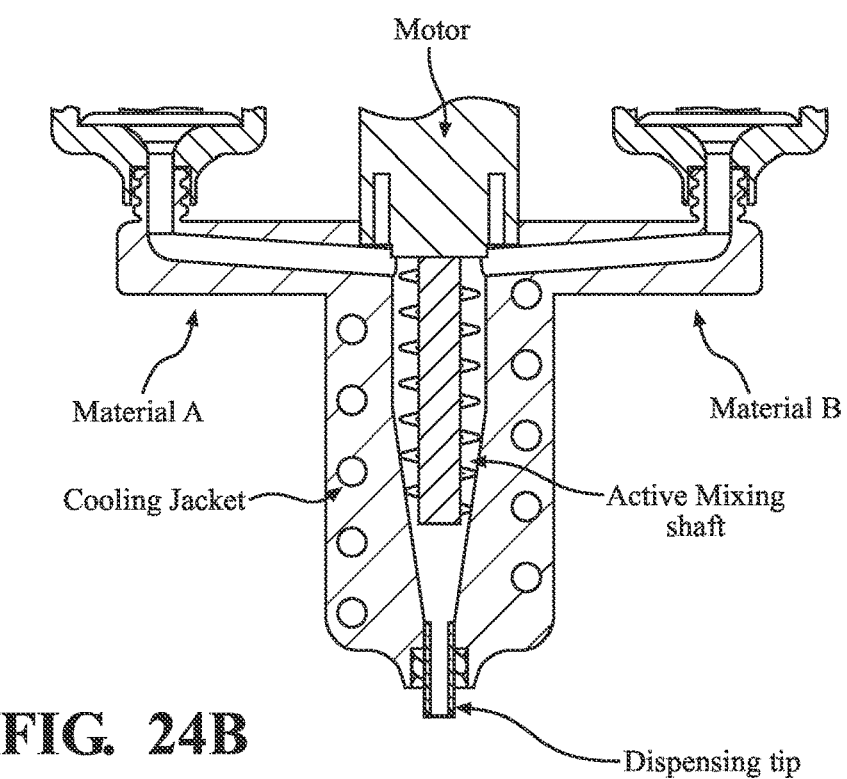
FIG. 24B is an active mixing unit in a dispensing tip and including a temperature control unit adjacent to the active mixing unit.

It is also to be appreciated that an AM system may include an active mixing unit, in addition to or in the place of the static mixer, and include a temperature control unit, adjacent, around or arranged close to the active mixing unit. The active mixing unit may contain one or more moving components, e.g. mixing elements that are not stationary, in contrast to a static mixer with no moving parts. For example, FIGS. 24A and 24B illustrate active mixing units including temperature control units in an AM system.

This disclosure generally incorporates by reference in its entirety the standard published by the International Organization for Standardization (ISO) and ASTM International titled "Additive manufacturing—General principles—Terminology," and designated ISO/ASTM 52900:2015 [ASTM F2792] (formerly ASTM Designation F2792-12a, titled "Standard Terminology for Additive Manufacturing Technologies"). Under this standard, "3D printer" is defined as "a machine used for 3D printing" and "3D printing" is defined as "the fabrication of objects through the deposition of a material using a print head, nozzle, or another printer technology". "Additive manufacturing (AM)" is defined as "a process of joining materials to make parts [i.e., "joined material forming a functional element that could constitute all or a section of an intended product"] from 3D model data, usually layer upon layer, as opposed to subtractive manufacturing methodologies." Synonyms/historical terms associated with and encompassed by 3D printing include additive fabrication, additive processes, additive techniques, additive layer manufacturing, layer manufacturing, solid freeform fabrication, and freeform fabrication. AM may also be referred to as rapid prototyping (RP). As used herein, "3D printing" is generally interchangeable with "additive manufacturing" and vice versa.

In various embodiments, the AM system 106 may be further defined, or otherwise described as, a fused filament fabrication printer, a fused deposition modeling printer, a direct ink deposition printer, a selective laser sintering printer, a selective laser melting printer, a stereolithography printer, a powder bed (binder jet) printer, a material jet printer, a direct metal laser sintering printer, an electron beam melting printer, a laminated object manufacturing deposition printer, a directed energy deposition printer, a laser powder forming printer, a polyjet printer, an ink-jetting printer, a material jetting printer, and/or a syringe extrusion printer.

Additional AM/3D printing technology components, elements, or devices (e.g. physical and/or electronic) may be incorporated or used in conjunction with the AM system 106. Examples of such components, elements, or devices include extruders, printing bases/platforms (e.g. stationary and/or motion controlled printing bases/platforms), various sensors/detectors (e.g. cameras, laser displacement sensors), computers and/or controllers, and the like, which may each be used independently or as part of the AM system 106 (e.g. with the components in electronic communication with one another). Likewise, 3D printing is generally associated with a host of related technologies used to fabricate physical objects from computer generated data sources. Some of these specific processes are included herein with reference to specific 3D printers. Further, some of these processes, and others, are described in greater detail below. Accordingly, many components and technologies may be utilized in connection with the method of this disclosure, as will be better understood in view of the description below.

A method of forming a three-dimensional (3D) article with the AM system 106 (i.e., the "AM method") (not shown) is also provided. The AM method includes I) forming a composition with the static mixer 20. The AM method further comprises II) printing the composition on a substrate with the AM system 106 to give a first layer on the substrate. Optionally, steps I) and II) may be repeated with independently selected composition(s) for any additional layer(s). Further optionally, the AM method may comprise exposing the layer(s) to a solidification condition.

Forming the composition with the static mixer 20 is not limited, and may be carried out as described above, using any materials suitable for forming a composition suitable for use in an AM process. Examples of specific materials are described further below.

In general, printing the composition on the substrate to give the first layer can mimic any one of the aforementioned 3D printing processes, or other 3D printing processes understood in the art. Specific examples of suitable 3D printing processes are also described in U.S. Pat. Nos. 5,204,055 and 5,387,380, the disclosures of which are incorporated herein by reference in their respective entireties. 3D printing is generally associated with a host of related technologies used to fabricate physical objects from computer generated data sources. Some of these specific processes are included above with reference to specific 3D printers. Further, some of these processes, and others, are described in greater detail below.

Typically, AM/3D printing processes have a common starting point, which is a computer generated data source or program which may describe an object. The computer generated data source or program can be based on an actual or virtual object. For example, an actual object can be scanned using a 3D scanner and scan data can be used to make the computer generated data source or program. Alternatively, the computer generated data source or program may be designed from scratch. The computer generated data source or program is typically converted into a standard tessellation language (STL) file format; however, other file formats can also or additionally be used. The file is generally read into 3D printing software, which takes the file and optionally user input to separate it into hundreds, thousands or even millions of "slices". The 3D printing software typically outputs machine instructions, which may be in the form of G-code, which is read by the 3D printer to build each slice. The machine instructions are transferred to the 3D printer (i.e., the AM system 106), which then builds the object, layer by layer, based on this slice information in the form of machine instructions. Thicknesses of these slices may vary.

In various embodiments, II) printing the composition on a substrate mimics a conventional material extrusion process. Material extrusion generally works by extruding material (in this case, the composition) through a nozzle (e.g. the nozzle 108) to print one cross-section of an object, which may be repeated for each subsequent layer. The nozzle 108 may be heated, cooled or otherwise manipulated during printing, which may aid in dispensing the particular composition. In these or other embodiments, the AM method mimics a conventional material jetting process. Material jetting printers often resemble traditional paper printers, e.g. inkjet printers. In material jetting, a print head moves around a print area jetting the particular composition. Repeating this process builds up the object one layer at a time. More specifically, during printing, the nozzle 108 and/or build platform 110 generally moves in the X-Y (horizontal) plane before moving in the Z-axis (vertical) plane once each layer is complete. In this way, the object which becomes the 3D article is built one layer at a time from the bottom upwards. This process can use material for two different purposes, building the object and supporting overhangs in order to avoid extruding material into thin air.

Ambient conditions may be manipulated or controlled during printing. For example, if desired, the substrate may be heated, cooled, mechanically vibrated, or otherwise manipulated before, during, and/or after the steps of printing to assist with solidification and/or curing. Further, the nozzle may be heated or cooled before, during, and/or after printing the first composition. As introduced above, more than one nozzle may be utilized with each nozzle having independently selected properties or parameters. Additionally, the AM method may be carried out in a heated or a moisturized environment such that solidification and/curing initiates after each step of printing. In particular embodiments, the composition(s), static mixer 20, nozzle 108, or other component(s) of the AM system 106 may be manipulated (e.g. controlled such that multiple compositions, substrates, or multi-part substrates can be mixed and/or joined together without significantly initiating material cure (e.g. solidification). In this fashion, multi-part compositions can be stored in different conditions (e.g. with respect to temperature, humidity/environment, etc.), and subsequently mixed together just prior to printing to accommodate and selectively utilize different cure rates, e.g. to form multi-part components.

Optionally, the resulting object(s) may be subjected to different post-processing regimes, such as further heating, solidification, infiltration, bakeout, and/or firing. This may be done, for example, to expedite cure of any binder, to reinforce the 3D article prepared, to eliminate any curing/cured binder (e.g. by decomposition), to consolidate the core material (e.g. by sintering/melting), and/or to form a composite material blending the properties of powder and binder.

Optionally, steps I) and II) may be repeated with independently selected composition(s) for additional layer(s) as desired. For example, in certain embodiments, the method further comprises III) forming a second composition with the static mixer 20, and IV) printing the second composition on the first layer with the AM system 106 to give a second layer on the first layer. In such embodiments, the second layer may only contact a portion of an exposed surface of the first layer. For example, depending on the desired shape of the 3D article, the second layer may build on the first layer selectively (i.e., on but a portion thereof).

The second composition may be the same as or different from the first composition utilized to form the first layer. As such, any description above relative to forming and/or printing the first composition to form the first layer is also applicable to forming and/or printing the second composition on the first layer to form the second layer, and each aspect of each step is independently selected. The AM method may optionally comprise repeating steps I) and II) (and/or steps III) and/or IV)) with independently selected composition(s) for any additional layer(s). The first layer, second layer (or subsequent or latter layer), and any additional layer(s), optionally included as described below, are referred to collectively herein as "the layers." "The layers," as used herein in plural form, may relate to the layers at any stage of the AM method, e.g. in an unsolidified and/or uncured state, in a partially solidified and/or partially cured state, in a solidified or a final cure state, etc. Generally, any description below relative to a particular layer is also applicable to any other layer, as the layers are independently formed and selected.

In general, the layers can each be of various dimension, including thickness and width. Thickness and/or width tolerances of the layers may depend on the apparatus, nozzle, and/or printing process used, with certain printing processes having relatively high resolutions and others having relatively low resolutions. Thicknesses of the layers can be uniform or may vary, and average thicknesses of the layers can be the same or different. Depending on a configuration of the first layer, and any additional layers, the thickness may refer to an average thickness and may be uniform or non-uniform. Average thickness is generally associated with thickness of the layer immediately after printing. In various embodiments, the layers independently have an average thickness of from about 1 to about 1,000,000, about 1 to about 10,000, about 2 to about 1,000, about 5 to about 750, about 10 to about 500, about 25 to about 250, or about 50 to 100 μm. Thinner and thicker thicknesses are also contemplated. This disclosure is not limited to any particular dimensions of any of the layers. For example, the 3D article may comprise a single layer while having a thickness of 2 meters.

In certain embodiments, the AM method comprises exposing the layer(s) to a solidification condition. The solidification condition may be any condition which contributes to solidification of the layers. For example, solidification may be a result of curing or increasing a crosslink density of the layers. Alternatively, solidification may be the result of a physical change within a layer, e.g. drying or removing any vehicle which may be present in any of the composition(s) and/or corresponding layer(s), as described below with respect to suitable compositions. Because each layer is independently selected, the solidification condition may vary for each layer.

Depending on a selection of the particular composition, as described below, the solidification condition may be selected from: (i) exposure to moisture; (ii) exposure to heat; (iii) exposure to irradiation; (iv) reduced ambient temperature; (v) exposure to solvent; (vi) exposure to mechanical vibration; or (vii) any combination of (i) to (vi). The solidification condition typically at least partially solidifies, alternatively solidifies, the layers.

The layers may be exposed to the solidification condition at any time in the AM method, and exposure to the solidification condition need not be delayed until two or more layers are formed in the AM method. For example, the layers may be exposed to the solidification condition individually and/or collectively. Specifically, the first layer may be exposed to the solidification condition to at least partially solidify the first layer prior to forming the second layer thereon. In these embodiments, exposing the first layer to the solidification condition forms an at least partially solidified first layer such that the second composition is printed on the at least partially solidified first layer. Similarly, the second layer may be at least partially solidified prior to repeating any printing steps for additional layers. The layers may also be subjected or exposed to a solidification condition when in contact with one another, even if these layers were at least partially solidified iteratively prior to each printing step.

At least partial solidification of the layer is generally indicative of cure; however, cure may be indicated in other ways, and solidification may be unrelated to curing. For example, curing may be indicated by a viscosity increase, e.g. bodying of the layer, an increased temperature of the layer, a transparency/opacity change of the layer, an increased surface or bulk hardness, etc. Generally, physical and/or chemical properties of the layer are modified as each layer at least partially solidifies to provide the at least partially solidified layers, respectively. In general, the term "at least partially solidified" means that the particular at least partially solidified layer substantially retains its shape upon exposure to ambient conditions. Ambient conditions refer to at least temperature, pressure, relative humidity, and any other condition that may impact a shape or dimension of the at least partially solidified layer. For example, ambient temperature is room temperature. Ambient conditions are distinguished from solidification conditions, where heat (or elevated temperature) is applied. By "substantially retains its shape," it is meant that a majority of the at least partially solidified layer retains its shape, e.g. the at least partially solidified layer does not flow or deform upon exposure to ambient conditions. Substantially may mean that at least about 50%, 60%, 70%, 80%, 90%, 95%, 96%, 97%, 98%, 99%, 99.5%, 99.9%, 99.99%, or at least about 99.999% or more of the volume of the at least partially solidified layer is maintained in the same shape and dimension over a period of time, e.g. after 1 minute, 5 minutes, 10 minutes, 30 minutes, 1 hour, 4 hours, 8 hours, 12 hours, 1 day, 1 week, 1 month, etc. Said differently, substantially retaining shape means that gravity does not substantially impact shape of the at least partially solidified layer upon exposure to ambient conditions.

The shape of the at least partially solidified layer may also impact whether the at least partially solidified layer substantially retains its shape. For example, when the at least partially solidified layer is rectangular or has another simplistic shape, the at least partially solidified layer may be more resistant to deformation at even lesser levels of solidification than at least partially solidified layers having more complex shapes. More specifically, prior to exposing one or more layers to the solidification condition, the first composition (as well as the second composition and any subsequent compositions) is generally flowable and may be in the form of a liquid, slurry, or gel, alternatively a liquid or slurry, alternatively a liquid. Viscosity of each composition can be independently adjusted depending on the type of apparatus and nozzle or other considerations. Adjusting viscosity can be achieved, for example, by heating or cooling any of the compositions, adjusting molecular weight of one or more components thereof, by adding or removing a solvent, carrier, and/or diluent, by adding a filler or thixotroping agent, etc.

In certain embodiments when the first layer is at least partially solidified prior to printing the second composition, printing of the second composition to form the second layer occurs before the at least partially solidified first layer has reached a final solidified state, i.e., while the at least partially solidified first layer is still "green." As used herein, "green" encompasses a partial solidified and/or a partial cure but not a final solidified and/or cure state. The distinction between partial solidification and/or cure state and a final solidification and/or cure state is whether the partially solidified and/or cured layer can undergo further solidification, curing and/or crosslinking. Functional groups of the components of the first composition may be present even in the final solidified and/or cure state, but may remain unreacted due to steric hindrance or other factors. In these embodiments, printing of the layers may be considered "wet-on-wet" such that the adjacent layers or filaments at least physically bond, and may also chemically bond, to one another. For example, in certain embodiments, depending on a selection of the compositions, components in each of the layers or filaments may chemically cross-link/cure across the print line. Because the layers may comprise coiled filaments, the print line is referred to as any contact point between adjacent filaments, or adjacent layers. There may be certain advantages in having the cross-link network extend across the print line in relation to longevity, durability and appearance of the 3D article. The layers may also be formed around one or more substructures that can provide support or another function of the 3D article. In other embodiments, the compositions are not curable such that the layers are merely physically bonded to one another in the 3D article.

When the layers are applied wet-on-wet, and/or when the layers are only partially solidified and/or partially cured, any iterative steps of exposing the layers to a curing and/or solidification condition may effect cure of more than just the previously printed layer. As noted above, because the cure may extend beyond or across the print line, and because a composite including the layers is typically subjected to the solidification condition, any other partially cured and/or solidified layers may also further, alternatively fully, cure and/or solidify upon a subsequent step of exposing the layers to a curing and/or solidification condition. By way of example, the AM method may comprise printing the second composition to form the second layer on the at least partially solidified first layer. Prior to printing another composition to form another layer on the second layer, the second layer may be exposed to a solidification condition such that printing another composition to form another layer on the second layer comprises printing another composition to form another layer on an at least partially solidified second layer. However, in such an embodiment, exposing the second layer to the solidification condition may, depending on the selection of the first and second compositions, also further cure and/or solidify the at least partially solidified first layer. The same is true for any additional or subsequent layers.

If desired, inserts, which may have varying shape, dimension, and may comprise any suitable material, may be disposed or placed on or at least partially in any layer during the AM method. For example, an insert may be utilized in between subsequent printing steps, and the insert may become integral with the 3D article upon its formation. Alternatively, the insert may be removed at any step during the AM method, e.g. to leave a cavity or for other functional or aesthetic purposes. The use of such inserts may provide better aesthetics and economics over relying on printing alone.

Further, if desired, a composite including all or some of the layers may be subjected to a final solidification step, which may be a final cure step. For example, to ensure that the 3D article is at a desired solidification state, a composite formed by printing and at least partially solidifying the layers may be subjected to a further step of solidification or further steps of solidification where layers may solidify under different types of solidification conditions. The final solidification step, if desired, may be the same as or different from any prior solidification steps, e.g. iterative solidification steps associated with each or any layer.

The total number of layers required will depend, for example, on the size and shape of the 3D article, as well as dimensions of the individual and collective layers. One of ordinary skill can readily determine how many layers are required or desired using conventional techniques, such as 3D scanning, rendering, modeling (e.g. parametric and/or vector based modeling), sculpting, designing, slicing, manufacturing and/or printing software. In certain embodiments, once the 3D article is in a final solidified or cured state, the individual layers may not be identifiable.

The compositions utilized in the AM method (e.g. the first and second compositions, and any subsequent or additional compositions to print subsequent or additional layers) are independently selected and may be the same as or different from one another. As such, for purposes of clarity, reference below to "the composition" or "the compositions" is applicable to the first and/or second compositions, and any subsequent or additional compositions utilized to print subsequent or additional layers, and are not to be construed as requiring the compositions to be the same as one another.

In certain embodiments, at least one of the compositions, e.g. the first composition, the second composition, and/or any additional compositions, comprises: (a) a silicone composition, (b) a polymer, (c) a metal, (d) a slurry, or (e) combinations thereof.

In certain embodiments, at least one of the compositions comprises the silicone composition. Suitable silicone compositions may be independently selected from (a) hydrosilylation-curable silicone compositions; (b) condensation-curable silicone compositions; (c) thiol-ene reaction-curable silicone compositions; (d) free-radical-curable silicone compositions; and (e) ring-opening reaction curable silicone compositions. In these embodiments, the silicone compositions are generally curable such that exposure to the solidification condition may be referred to as exposure to a curing condition. As understood in the art, these silicone compositions may be cured via different curing conditions, such as exposure to moisture, exposure to heat, exposure to irradiation, etc. Moreover, these silicone compositions may be curable upon exposure to different types of curing conditions, e.g. both heat and irradiation, which may be utilized together or as only one. In addition, exposure to a curing condition may cure or initiate cure of different types of silicone compositions. For example, heat may be utilized to cure or initiate cure of condensation-curable silicone compositions, hydrosilylation-curable silicone compositions, and free radical-curable silicone compositions.

The silicone compositions may have the same cure mechanism upon application of the curing condition, but may still be independently selected from one another. For example, the first composition may comprise a condensation-curable silicone composition, and the second composition may also comprise a condensation-curable silicone composition, wherein the condensation-curable silicone compositions differ from one another, e.g. by components, relative amounts thereof, etc. In certain embodiments, each of the silicone compositions utilized in the method cures via the same cure mechanism upon application of the curing condition. These embodiments easily allow for cure across the print line, if desired, as the components of in each of the silicone compositions may readily react with one another in view of having the same cure mechanism upon application of the curing condition. In these embodiments, each of the silicone compositions may still differ from one another in terms of the actual components utilized and relative amounts thereof, even though the cure mechanism is the same in each of the silicone compositions. In contrast, although there may be some cure across the print line when each of the layers cures via a different mechanism (e.g. hydrosilylation versus condensation), components in these layers may not be able to react with one another upon application of the curing condition, which may be desirable in other applications.

In certain embodiments, at least one of the silicone compositions comprises a hydrosilylation-curable silicone composition. In these embodiments, the hydrosilylation-curable silicone composition typically comprises: (A) an organopolysiloxane having an average of at least two silicon-bonded alkenyl groups or silicon-bonded hydrogen atoms per molecule; (B) an organosilicon compound having an average of at least two silicon-bonded hydrogen atoms or silicon-bonded alkenyl groups per molecule capable of reacting with the silicon-bonded alkenyl groups or silicon-bonded hydrogen atoms in the organopolysiloxane (A); and (C) a hydrosilylation catalyst. When the organopolysiloxane (A) includes silicon-bonded alkenyl groups, the organosilicon compound (B) includes at least two silicon-bonded hydrogen atoms per molecule, and when the organopolysiloxane (A) includes silicon-bonded hydrogen atoms, the organosilicon compound (B) includes at least two silicon-bonded alkenyl groups per molecule. The organosilicon compound (B) may be referred to as a cross-linker or cross-linking agent.

The organopolysiloxane (A) and the organosilicon compound (B) may independently be linear, branched, cyclic, or resinous. In particular, the organopolysiloxane (A) and the organosilicon compound (B) may comprise any combination of M, D, T, and Q units. The symbols M, D, T, and Q represent the functionality of structural units of organopolysiloxanes. M represents the monofunctional unit $R^0{}_3SiO_{1/2}$. D represents the difunctional unit $R^0{}_2SiO_{2/2}$. T represents the trifunctional unit $R^0SiO_{3/2}$. Q represents the tetrafunctional unit $SiO_{4/2}$. Generic structural formulas of these units are shown below:

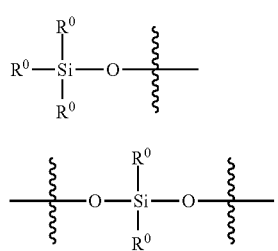

[M]

[D]

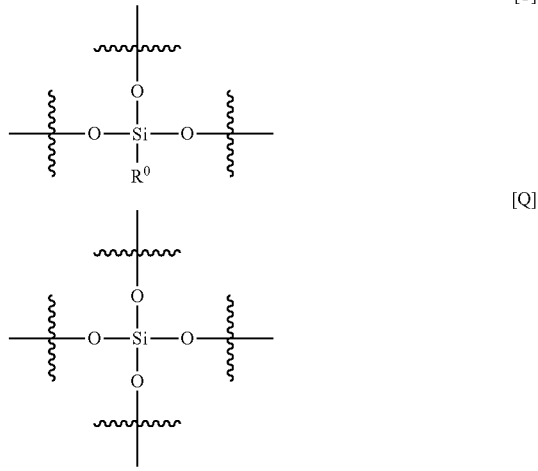

In these structures/formulae, each $R^0$ may be any hydrocarbon, aromatic, aliphatic, alkyl, alkenyl, or alkynl group.

The particular organopolysiloxane (A) and organosilicon compound (B) may be selected based on desired properties of the 3D article and layers during the AM method. For example, it may be desirable for the layers to be in the form of an elastomer, a gel, a resin, etc., and selecting the components of the silicone composition allows one of skill in the art to achieve a range of desirable properties.

For example, in certain embodiments, one of the organopolysiloxane (A) and the organosilicon compound (B) comprises a silicone resin, which typically comprises T and/or Q units in combination with M and/or D units. When the organopolysiloxane (A) and/or organosilicon compound (B) comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the hydrosilylation-curable silicone composition comprises a resin, the layer(s) and resulting 3D article have increased rigidity. In other embodiments, the organopolysiloxane (A) and/or the organosilicon compound (B) is an organopolysiloxane comprising repeating D units. Such organopolysiloxanes are substantially linear but may include some branching attributable to T and/or Q units. Alternatively, such organopolysiloxanes are linear. In these embodiments, the layer(s) and resulting 3D article are elastomeric.

The silicon-bonded alkenyl groups and silicon-bonded hydrogen atoms of the organopolysiloxane (A) and the organosilicon compound (B), respectively, may independently be pendent, terminal, or in both positions.

In a specific embodiment, the organopolysiloxane (A) has the general formula:

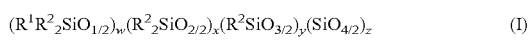

(I)

wherein each $R^1$ is an independently selected hydrocarbyl group, which may be substituted or unsubstituted, and each $R^2$ is independently selected from $R^1$ and an alkenyl group, with the proviso that at least two of $R^2$ are alkenyl groups, and w, x, y, and z are mole fractions such that w+x+y+z=1. As understood in the art, for linear organopolysiloxanes, subscripts y and z are generally 0, whereas for resins, subscripts y and/or z>0. Various alternative embodiments are described below with reference to w, x, y and z. In these embodiments, the subscript w may have a value of from 0 to 0.9999, alternatively from 0 to 0.999, alternatively from 0 to 0.99, alternatively from 0 to 0.9, alternatively from 0.9 to 0.999, alternatively from 0.9 to 0.999, alternatively from 0.8 to 0.99, alternatively from 0.6 to 0.99. The subscript x typically has a value of from 0 to 0.9, alternatively from 0 to 0.45, alternatively from 0 to 0.25. The subscript y typically has a value of from 0 to 0.99, alternatively from 0.25 to 0.8, alternatively from 0.5 to 0.8. The subscript z typically has a value of from 0 to 0.99, alternatively from 0 to 0.85, alternatively from 0.85 to 0.95, alternatively from 0.6 to 0.85, alternatively from 0.4 to 0.65, alternatively from 0.2 to 0.5, alternatively from 0.1 to 0.45, alternatively from 0 to 0.25, alternatively from 0 to 0.15.

In certain embodiments, each $R^1$ is a $C_1$ to $C_{10}$ hydrocarbyl group, which may be substituted or unsubstituted, and which may include heteroatoms within the hydrocarbyl group, such as oxygen, nitrogen, sulfur, etc. Acyclic hydrocarbyl and halogen-substituted hydrocarbyl groups containing at least 3 carbon atoms can have a branched or unbranched structure. Examples of hydrocarbyl groups represented by $R^1$ include, but are not limited to, alkyl groups, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl groups, such as cyclopentyl, cyclohexyl, and methylcyclohexyl; aryl groups, such as phenyl and naphthyl; alkaryl groups, such as tolyl and xylyl; and aralkyl groups, such as benzyl and phenethyl. Examples of halogen-substituted hydrocarbyl groups represented by $R^1$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

The alkenyl groups represented by $R^2$, which may be the same or different within the organopolysiloxane (A), typically have from 2 to 10 carbon atoms, alternatively from 2 to 6 carbon atoms, and are exemplified by, for example, vinyl, allyl, butenyl, hexenyl, and octenyl.

In these embodiments, the organosilicon compound (B) may be further defined as an organohydrogensilane, an organopolysiloxane an organohydrogensiloxane, or a combination thereof. The structure of the organosilicon compound (B) can be linear, branched, cyclic, or resinous. In acyclic polysilanes and polysiloxanes, the silicon-bonded hydrogen atoms can be located at terminal, pendant, or at both terminal and pendant positions. Cyclosilanes and cyclosiloxanes typically have from 3 to 12 silicon atoms, alternatively from 3 to 10 silicon atoms, alternatively from 3 to 4 silicon atoms. The organohydrogensilane can be a monosilane, disilane, trisilane, or polysilane.

Hydrosilylation catalyst (C) includes at least one hydrosilylation catalyst that promotes the reaction between the organopolysiloxane (A) and the organosilicon compound (B). The hydrosilylation catalyst (C) can be any of the well-known hydrosilylation catalysts comprising a platinum group metal (i.e., platinum, rhodium, ruthenium, palladium, osmium and iridium) or a compound containing a platinum group metal. Typically, the platinum group metal is platinum, based on its high activity in hydrosilylation reactions.

Specific hydrosilylation catalysts suitable for (C) include the complexes of chloroplatinic acid and certain vinyl-containing organosiloxanes disclosed by Willing in U.S. Pat. No. 3,419,593, the portions of which address hydrosilylation catalysts are hereby incorporated by reference. A catalyst of this type is the reaction product of chloroplatinic acid and 1,3-diethenyl-1,1,3,3-tetramethyldisiloxane.

The hydrosilylation catalyst (C) can also be a supported hydrosilylation catalyst comprising a solid support having a platinum group metal on the surface thereof. A supported catalyst can be conveniently separated from organopolysiloxanes, for example, by filtering the reaction mixture. Examples of supported catalysts include, but are not limited to, platinum on carbon, palladium on carbon, ruthenium on carbon, rhodium on carbon, platinum on silica, palladium on silica, platinum on alumina, palladium on alumina, and ruthenium on alumina.

In addition or alternatively, the hydrosilylation catalyst (C) can also be a microencapsulated platinum group metal-containing catalyst comprising a platinum group metal encapsulated in a thermoplastic resin. Hydrosilylation-curable silicone compositions including microencapsulated hydrosilylation catalysts are stable for extended periods of time, typically several months or longer, under ambient conditions, yet cure relatively rapidly at temperatures above the melting or softening point of the thermoplastic resin(s). Microencapsulated hydrosilylation catalysts and methods of preparing them are well known in the art, as exemplified in U.S. Pat. No. 4,766,176 and the references cited therein, and U.S. Pat. No. 5,017,654. The hydrosilylation catalyst (C) can be a single catalyst or a mixture comprising two or more different catalysts that differ in at least one property, such as structure, form, platinum group metal, complexing ligand, and thermoplastic resin.

The hydrosilylation catalyst (C) may also, or alternatively, be a photoactivatable hydrosilylation catalyst, which may initiate curing via irradiation and/or heat. The photoactivatable hydrosilylation catalyst can be any hydrosilylation catalyst capable of catalyzing the hydrosilylation reaction, particularly upon exposure to radiation having a wavelength of from 150 to 800 nanometers (nm). Specific examples of photoactivatable hydrosilylation catalysts include, but are not limited to, platinum(II) β-diketonate complexes such as platinum(II) bis(2,4-pentanedioate), platinum(II) bis(2,4-hexanedioate), platinum(II) bis(2,4-heptanedioate), platinum(II) bis(1-phenyl-1,3-butanedioate, platinum(II) bis(1,3-diphenyl-1,3-propanedioate), platinum(II) bis(1,1,1,5,5,5-hexafluoro-2,4-pentanedioate); (η-cyclopentadienyl)trialkylplatinum complexes, such as (Cp)trimethylplatinum, (Cp)ethyldimethylplatinum, (Cp)triethylplatinum, (chloro-Cp)trimethylplatinum, and (trimethylsilyl-Cp)trimethylplatinum, where Cp represents cyclopentadienyl; triazene oxide-transition metal complexes, such as $Pt[C_6H_5NNNOCH_3]_4$, $Pt[p\text{-}CN\text{—}C_6H_4NNNOC_6H_{11}]_4$, $Pt[p\text{-}H_3COC_6H_4NNNOC_6H_{11}]_4$, $Pt[p\text{-}CH_3(CH_2)_x\text{—}C_6H_4NNNOCH_3]_4$, 1,5-cyclooctadiene.$Pt[p\text{-}CN\text{—}C_6H_4NNNOC_6H_{11}]_2$, 1,5-cyclooctadiene.$Pt[p\text{-}CH_3O\text{—}C_6H_4NNNOCH_3]_2$, $[(C_6H_5)_3P]_3Rh[p\text{-}CN\text{—}C_6H_4NNNOC_6H_{11}]$, and $Pd[p\text{-}CH_3(CH_2)_x\text{—}C_6H_4NNNOCH_3]_2$, where x is 1, 3, 5, 11, or 17; (η-diolefin) (σ-aryl)platinum complexes, such as ($η^4$-1,5-cyclooctadienyl)diphenylplatinum, $η^4$-1,3,5,7-cyclooctatetraenyl)diphenylplatinum, ($η^4$-2,5-norboradienyl)diphenylplatinum, ($η^4$-1,5-cyclooctadienyl)bis-(4-dimethylaminophenyl)platinum, ($η^4$-1,5-cyclooctadienyl)bis-(4-acetylphenyl)platinum, and ($η^4$-1,5-cyclooctadienyl)bis-(4-trifluormethylphenyl)platinurn.

Typically, the photoactivatable hydrosilylation catalyst is a Pt(II) β-diketonate complex and more typically the catalyst is platinum(II) bis(2,4-pentanedioate). The hydrosilylation catalyst (C) can be a single photoactivatable hydrosilylation catalyst or a mixture comprising two or more different photoactivatable hydrosilylation catalysts.

The concentration of the hydrosilylation catalyst (C) is sufficient to catalyze the addition reaction between the organopolysiloxane (A) and the organosilicon compound (B). In certain embodiments, the concentration of the hydrosilylation catalyst (C) is sufficient to provide typically from 0.1 to 1000 ppm of platinum group metal, alternatively from 0.5 to 100 ppm of platinum group metal, alternatively from 1 to 25 ppm of platinum group metal, based on the combined weight of the organopolysiloxane (A) and the organosilicon compound (B).

The hydrosilylation-curable silicone composition may be a two-part composition where the organopolysiloxane (A) and organosilicon compound (B) are in separate parts. In these embodiments, the hydrosilylation catalyst (C) may be present along with either or both of the organopolysiloxane (A) and organosilicon compound (B). Alternatively still, the hydrosilylation catalyst (C) may be separate from the organopolysiloxane (A) and organosilicon compound (B) in a third part such that the hydrosilylation reaction-curable silicone composition is a three-part composition.

In one specific embodiment the hydrosilylation-curable silicone composition comprises $ViMe_2(Me_2SiO)_{128}SiMe_2Vi$ as the organopolysiloxane (A), $Me_3SiO(Me_2SiO)_{14}(MeHSiO)_{16}SiMe_3$ as the organosilicon compound (B) and a complex of platinum with divinyltretramethyldisiloxane as (C) such that platinum is present in a concentration of 5 ppm based on (A), (B) and (C).

Solidification conditions for such hydrosilylation-curable silicone compositions may vary. For example, hydrosilylation-curable silicone composition may be solidified or cured upon exposure to irradiation and/or heat. One of skill in the art understands how selection of the hydrosilylation catalyst (C) impacts techniques for solidification and curing. In particular, photoactivatable hydrosilylation catalysts are typically utilized when curing via irradiation is desired.

In these or other embodiments, at least one of the silicone compositions comprises a condensation-curable silicone composition. In these embodiments, the condensation-curable silicone composition typically comprises (A') an organopolysiloxane having an average of at least two silicon-bonded hydroxyl or hydrolysable groups per molecule; optionally (B') an organosilicon compound having an average of at least two silicon-bonded hydrogen atoms, hydroxyl groups, or hydrolysable groups per molecule; and (C') a condensation catalyst. Although any parameter or condition may be selectively controlled during the AM method or any individual step thereof, relative humidity and/or moisture content of ambient conditions may be selectively controlled to further impact a cure rate of condensation-curable silicone compositions.

The organopolysiloxane (A') and the organosilicon compound (B') may independently be linear, branched, cyclic, or resinous. In particular, the organopolysiloxane (A') and the organosilicon compound (B') may comprise any combination of M, D, T, and Q units, as with the organopolysiloxane (A') and the organosilicon compound (B') disclosed above.

The particular organopolysiloxane (A') and organosilicon compound (B') may be selected based on desired properties of the 3D article and layers during the AM method. For example, it may be desirable for the layers to be in the form of an elastomer, a gel, a resin, etc., and selecting the components of the silicone composition allows one of skill in the art to achieve a range of desirable properties.

For example, in certain embodiments, one of the organopolysiloxane (A') and the organosilicon compound (B') comprises a silicone resin, which typically comprises T and/or Q units in combination with M and/or D units. When the organopolysiloxane (A') and/or organosilicon compound (B') comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the condensation-curable silicone composition comprises a resin, the layer(s) and resulting 3D article have increased rigidity.

Alternatively, in other embodiments, the organopolysiloxane (A') and/or the organosilicon compound (B') is an organopolysiloxane comprising repeating D units. Such organopolysiloxanes are substantially linear but may include some branching attributable to T and/or Q units. Alternatively, such organopolysiloxanes are linear. In these embodiments, the layer(s) and resulting 3D article are elastomeric.

The silicon-bonded hydroxyl groups and silicon-bonded hydrogen atoms, hydroxyl groups, or hydrolysable groups of the organopolysiloxane (A') and the organosilicon compound (B'), respectively, may independently be pendent, terminal, or in both positions.

As known in the art, silicon-bonded hydroxyl groups result from hydrolyzing silicon-bonded hydrolysable groups. These silicon-bonded hydroxyl groups may condense to form siloxane bonds with water as a byproduct. Examples of hydrolysable groups include the following silicon-bonded groups: H, a halide group, an alkoxy group, an alkylamino group, a carboxy group, an alkyliminoxy group, an alkenyloxy group, or an N-alkylamido group. Alkylamino groups may be cyclic amino groups.

In a specific embodiment, the organopolysiloxane (A') has the general formula:

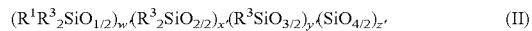

$$(R^1R^3{}_2SiO_{1/2})_{w'}(R^3{}_2SiO_{2/2})_{x'}(R^3SiO_{3/2})_{y'}(SiO_{4/2})_{z'} \quad (II)$$

wherein each $R^1$ is defined above and each $R^3$ is independently selected from $R^1$ and a hydroxyl group, a hydrolysable group, or combinations thereof with the proviso that at least two of $R^3$ are hydroxyl groups, hydrolysable groups, or combinations thereof, and w', x', y', and z' are mole fractions such that w'+x'+y'+z'=1. As understood in the art, for linear organopolysiloxanes, subscripts y' and z' are generally 0, whereas for resins, subscripts y' and/or z'>0. Various alternative embodiments are described below with reference to w', x', y' and z'. In these embodiments, the subscript w' may have a value of from 0 to 0.9999, alternatively from 0 to 0.999, alternatively from 0 to 0.99, alternatively from 0 to 0.9, alternatively from 0.9 to 0.999, alternatively from 0.9 to 0.999, alternatively from 0.8 to 0.99, alternatively from 0.6 to 0.99. The subscript x' typically has a value of from 0 to 0.9, alternatively from 0 to 0.45, alternatively from 0 to 0.25. The subscript y' typically has a value of from 0 to 0.99, alternatively from 0.25 to 0.8, alternatively from 0.5 to 0.8. The subscript z' typically has a value of from 0 to 0.99, alternatively from 0 to 0.85, alternatively from 0.85 to 0.95, alternatively from 0.6 to 0.85, alternatively from 0.4 to 0.65, alternatively from 0.2 to 0.5, alternatively from 0.1 to 0.45, alternatively from 0 to 0.25, alternatively from 0 to 0.15.

As set forth above, the condensation-curable silicone composition further comprises the organosilicon compound (B'). The organosilicon compound (B') may be linear, branched, cyclic, or resinous. In one embodiment, the organosilicon compound (B') has the formula $R^1{}_qSiX_{4-q}$, wherein $R^1$ is defined above, X is a hydrolysable group, and q is 0 or 1.

Specific examples of organosilicon compounds (B') include alkoxy silanes such as $MeSi(OCH_3)_3$, $CH_3Si(OCH_2CH_3)_3$, $CH_3Si(OCH_2CH_2CH_3)_3$, $CH_3Si[O(CH_2)_3CH_3]_3$, $CH_3CH_2Si(OCH_2CH_3)_3$, $C_6H_5Si(OCH_3)_3$, $C_6H_5CH_2Si(OCH_3)_3$, $C_6H_5Si(OCH_2CH_3)_3$, $CH_2=CHSi(OCH_3)_3$, $CH_2=CHCH_2Si(OCH_3)_3$, $CF_3CH_2CH_2Si(OCH_3)_3$, $CH_3Si(OCH_2CH_2OCH_3)_3$, $CF_3CH_2CH_2Si(OCH_2CH_2OCH_3)_3$, $CH_2=CHSi(OCH_2CH_2OCH_3)_3$, $CH_2=CHCH_2Si(OCH_2CH_2OCH_3)_3$, $C_6H_5Si(OCH_2CH_2OCH_3)_3$, $Si(OCH_3)_4$, $Si(OC_2H_5)_4$, and $Si(OC_3H_7)_4$; organoacetoxysilanes such as $CH_3Si(OCOCH_3)_3$, $CH_3CH_2Si(OCOCH_3)_3$, and $CH_2=CHSi(OCOCH_3)_3$; organoiminooxysilanes such as $CH_3Si[O-N=C(CH_3)CH_2CH_3]_3$, $Si[O-N=C(CH_3)CH_2CH_3]_4$, and $CH_2=CHSi[O-N=C(CH_3)CH_2CH_3]_3$; organoacetamidosilanes such as $CH_3Si[NHC(=O)CH_3]_3$ and $C_6H_5Si[NHC(=O)CH_3]_3$; amino silanes such as $CH_3Si[NH(s-C_4H_9)]_3$ and $CH_3Si(NHC_6H_{11})_3$; and organoaminooxysilanes.

The organosilicon compound (B') can be a single silane or a mixture of two or more different silanes, each as described above. Also, methods of preparing tri- and tetra-functional silanes are well known in the art; many of these silanes are commercially available.

When present, the concentration of the organosilicon compound (B') in the condensation-curable silicone composition is sufficient to cure (cross-link) the organopolysiloxane (A'). The particular amount of the organosilicon compound (B') utilized depends on the desired extent of cure, which generally increases as the ratio of the number of moles of silicon-bonded hydrolysable groups in the organosilicon compound (B') to the number of moles of silicon-bonded hydroxy groups in the organopolysiloxane (A') increases. The optimum amount of the organosilicon compound (B') can be readily determined by routine experimentation.

The condensation catalyst (C') can be any condensation catalyst typically used to promote condensation of silicon-bonded hydroxy (silanol) groups to form Si—O—Si linkages. Examples of condensation catalysts include, but are not limited to, amines; and complexes of lead, tin, zinc, and iron with carboxylic acids. In particular, the condensation catalyst ($C^1$) can be selected from tin(II) and tin(IV) compounds such as tin dilaurate, tin dioctoate, and tetrabutyl tin; and titanium compounds such as titanium tetrabutoxide.

When present, the concentration of the condensation catalyst (C') is typically from 0.1 to 10% (w/w), alternatively from 0.5 to 5% (w/w), alternatively from 1 to 3% (w/w), based on the total weight of the organopolysiloxane (A') in the condensation-curable silicone composition.

When the condensation-curable silicone composition includes the condensation catalyst (C'), the condensation-curable silicone composition is typically a two-part composition where the organopolysiloxane (A') and condensation catalyst (C') are in separate parts. In this embodiment, the organosilicon compound (B') is typically present along with the condensation catalyst (C'). Alternatively still, the condensation-curable silicone composition may be a three-part composition, where the organopolysiloxane (A'), the organosilicon compound (B') and condensation catalyst (C') are in separate parts.

Solidification conditions for such condensation-curable silicone compositions may vary. For example, condensation-curable silicone composition may be solidified or cured upon exposure to ambient conditions, a moisturized atmosphere, and/or heat, although heat is commonly utilized to accelerate solidification and curing.

In these or other embodiments, at least one of the silicone compositions comprises a free radical-curable silicone composition. In one embodiment, the free radical-curable silicone composition comprises (A") an organopolysiloxane having an average of at least two silicon-bonded unsaturated groups and (C") a free radical initiator.

The organopolysiloxane (A") may be linear, branched, cyclic, or resinous. In particular, the organopolysiloxane (A") may comprise any combination of M, D, T, and Q units, as with the organopolysiloxane (A') and the organosilicon compound (B') disclosed above. The particular organopolysiloxane (A") may be selected based on desired properties of the 3D article and layers during the AM method. For example, it may be desirable for the layers to be in the form of an elastomer, a gel, a resin, etc., and selecting the components of the silicone composition allows one of skill in the art to achieve a range of desirable properties.

For example, in certain embodiments, the organopolysiloxane (A") comprises a silicone resin, which typically comprises T and/or Q units in combination with M and/or D units. When the organopolysiloxane (A") comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the hydrosilylation-curable silicone composition comprises a resin, the layer(s) and resulting 3D article have increased rigidity. Alternatively, in other embodiments, the organopolysiloxane (A") comprises repeating D units. Such organopolysiloxanes are substantially linear but may include some branching attributable to T and/or Q units. Alternatively, such organopolysiloxanes are linear. In these embodiments, the layer(s) and resulting 3D article are elastomeric.

The silicon-bonded unsaturated groups of the organopolysiloxane (A") may be pendent, terminal, or in both positions. The silicon-bonded unsaturated groups may include ethylenic unsaturation in the form of double bonds and/or triple bonds. Exemplary examples of silicon-bonded unsaturated groups include silicon-bonded alkenyl groups and silicon-bonded alkynyl groups.

In a specific embodiment, the organopolysiloxane (A") has the general formula:

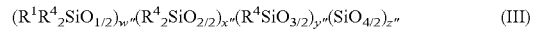

$$(R^1R^4{}_2SiO_{1/2})_{w''}(R^4{}_2SiO_{2/2})_{x''}(R^4SiO_{3/2})_{y''}(SiO_{4/2})_{z''} \qquad \text{(III)}$$

wherein each $R^1$ is defined above and each $R^4$ is independently selected from $R^1$ and an unsaturated group, with the proviso that at least two of $R^4$ are unsaturated groups, and w", x", y", and z" are mole fractions such that w"+x"+y"+z"=1. As understood in the art, for linear organopolysiloxanes, subscripts y" and z" are generally 0, whereas for resins, subscripts y" and/or z">0. Various alternative embodiments are described below with reference to w", x", y" and z". In these embodiments, the subscript w" may have a value of from 0 to 0.9999, alternatively from 0 to 0.999, alternatively from 0 to 0.99, alternatively from 0 to 0.9, alternatively from 0.9 to 0.999, alternatively from 0.9 to 0.999, alternatively from 0.8 to 0.99, alternatively from 0.6 to 0.99. The subscript x" typically has a value of from 0 to 0.9, alternatively from 0 to 0.45, alternatively from 0 to 0.25. The subscript y" typically has a value of from 0 to 0.99, alternatively from 0.25 to 0.8, alternatively from 0.5 to 0.8. The subscript z" typically has a value of from 0 to 0.99, alternatively from 0 to 0.85, alternatively from 0.85 to 0.95, alternatively from 0.6 to 0.85, alternatively from 0.4 to 0.65, alternatively from 0.2 to 0.5, alternatively from 0.1 to 0.45, alternatively from 0 to 0.25, alternatively from 0 to 0.15.

The unsaturated groups represented by $R^4$ may be the same or different and are independently selected from alkenyl and alkynyl groups. The alkenyl groups represented by $R^4$, which may be the same or different, are as defined and exemplified in the description of $R^2$ above. The alkynyl groups represented by $R^4$, which may be the same or different, typically have from 2 to about 10 carbon atoms, alternatively from 2 to 8 carbon atoms, and are exemplified by, but are not limited to, ethynyl, propynyl, butynyl, hexynyl, and octynyl.

The free radical-curable silicone composition can further comprise an unsaturated compound selected from (i) at least one organosilicon compound having at least one silicon-bonded alkenyl group per molecule, (ii) at least one organic compound having at least one aliphatic carbon-carbon double bond per molecule, (iii) at least one organosilicon compound having at least one silicon-bonded acryloyl group per molecule; (iv) at least one organic compound having at least one acryloyl group per molecule; and (v) mixtures comprising (i), (ii), (iii) and (iv). The unsaturated compound can have a linear, branched, or cyclic structure.

The organosilicon compound (i) can be an organosilane or an organosiloxane. The organosilane can be a monosilane, disilane, trisilane, or polysilane. Similarly, the organosiloxane can be a disiloxane, trisiloxane, or polysiloxane. Cyclosilanes and cyclosiloxanes typically have from 3 to 12 silicon atoms, alternatively from 3 to 10 silicon atoms, alternatively from 3 to 4 silicon atoms. In acyclic polysilanes and polysiloxanes, the silicon-bonded alkenyl group(s) can be located at terminal, pendant, or at both terminal and pendant positions.

Specific examples of organosilanes include, but are not limited to, silanes having the following formulae: $Vi_4Si$, $PhSiVi_3$, $MeSiVi_3$, $PhMeSiVi_2$, $Ph_2SiVi_2$, and $PhSi(CH_2CH=CH_2)_3$. Specific examples of organosiloxanes include, but are not limited to, siloxanes having the following formulae: $PhSi(OSiMe_2Vi)_3$, $Si(OSiMe_2Vi)_4$, $MeSi(OSiMe_2Vi)_3$, and $Ph_2Si(OSiMe_2Vi)_2$.

The organic compound can be any organic compound containing at least one aliphatic carbon-carbon double bond per molecule, provided the compound does not prevent the organopolysiloxane (A") from curing to form a silicone resin film. The organic compound can be an alkene, a diene, a triene, or a polyene. Further, in acyclic organic compounds, the carbon-carbon double bond(s) can be located at terminal, pendant, or at both terminal and pendant positions.

The organic compound can contain one or more functional groups other than the aliphatic carbon-carbon double bond. Examples of suitable functional groups include, but are not limited to, —O—, >C=O, —CHO, —CO2-, —C≡N, —NO2, >C=C<, —C≡C—, —F, —Cl, —Br, and —I. The suitability of a particular unsaturated organic compound for use in the free-radical curable silicone composition of the present invention can be readily determined by routine experimentation.

Examples of organic compounds containing aliphatic carbon-carbon double bonds include, but are not limited to, 1,4-divinylbenzene, 1,3-hexadienylbenzene, and 1,2-diethenylcyclobutane.

The unsaturated compound can be a single unsaturated compound or a mixture comprising two or more different unsaturated compounds, each as described above. For example, the unsaturated compound can be a single organosilane, a mixture of two different organosilanes, a single organosiloxane, a mixture of two different organosiloxanes, a mixture of an organosilane and an organosiloxane, a single organic compound, a mixture of two different organic compounds, a mixture of an organosilane and an organic compound, or a mixture of an organosiloxane and an organic compound.

The free radical initiator (C") is a compound that produces a free radical, and is utilized to initiate polymerization of the organopolysiloxane (A"). Typically, the free radical initiator (C") produces a free radical via dissociation caused by irradiation, heat, and/or reduction by a reducing agent. The free radical initiator (C") may be an organic peroxide. Examples of organic peroxides include, diaroyl peroxides such as dibenzoyl peroxide, di-p-chlorobenzoyl peroxide, and bis-2,4-dichlorobenzoyl peroxide; dialkyl peroxides such as di-t-butyl peroxide and 2,5-dimethyl-2,5-di-(t-butylperoxy)hexane; diaralkyl peroxides such as dicumyl peroxide; alkyl aralkyl peroxides such as t-butyl cumyl peroxide and 1,4-bis(t-butylperoxyisopropyl)benzene; and alkyl aryl peroxides such as t-butyl perbenzoate, t-butyl peracetate, and t-butyl peroctoate.

The organic peroxide (C") can be a single peroxide or a mixture comprising two or more different organic peroxides. The concentration of the organic peroxide is typically from 0.1 to 5% (w/w), alternatively from 0.2 to 2% (w/w), based on the weight of the organopolysiloxane (A").

The free radical-curable silicone composition may be a two-part composition where the organopolysiloxane (A") and the free radical initiator (C") are in separate parts.

In other embodiments, at least one of the silicone compositions comprises a ring opening reaction-curable silicone composition. In various embodiments, the ring opening reaction-curable silicone composition comprises (A'") an organopolysiloxane having an average of at least two epoxy-substituted groups per molecule and (C") a curing agent. However, the ring opening reaction-curable silicone composition is not limited specifically to epoxy-functional organopolysiloxanes. Other examples of ring opening reaction-curable silicone compositions include those comprising silacyclobutane and/or benzocyclobutene.

The organopolysiloxane (A'") may be linear, branched, cyclic, or resinous. In particular, the organopolysiloxane (A'") may comprise any combination of M, D, T, and Q units, as with the organopolysiloxane (A') and the organosilicon compound (B') disclosed above.

The particular organopolysiloxane (A'") may be selected based on desired properties of the 3D article and layers during the AM method. For example, it may be desirable for the layers to be in the form of an elastomer, a gel, a resin, etc., and selecting the components of the silicone composition allows one of skill in the art to achieve a range of desirable properties.

For example, in certain embodiments, the organopolysiloxane (A'") comprises a silicone resin, which typically comprises T and/or Q units in combination with M and/or D units. When the organopolysiloxane (A'") comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the hydrosilylation-curable silicone composition comprises a resin, the layer(s) and resulting 3D article have increased rigidity.

Alternatively, in other embodiments, the organopolysiloxane (A'") comprises repeating D units. Such organopolysiloxanes are substantially linear but may include some branching attributable to T and/or Q units. Alternatively, such organopolysiloxanes are linear. In these embodiments, the layer(s) and resulting 3D article are elastomeric.

The epoxy-substituted groups of the organopolysiloxane (A'") may be pendent, terminal, or in both positions. "Epoxy-substituted groups" are generally monovalent organic groups in which an oxygen atom, the epoxy substituent, is directly attached to two adjacent carbon atoms of a carbon chain or ring system. Examples of epoxy-substituted organic groups include, but are not limited to, 2,3- epoxypropyl, 3,4-epoxybutyl, 4,5-epoxypentyl, 2-glycidoxyethyl, 3-glycidoxypropyl, 4-glycidoxybutyl, 2-(3,4-epoxycylohexyl)ethyl, 3-(3,4-epoxycylohexyl)propyl, 2-(3,4-epoxy-3-methylcylohexyl)-2-methylethyl, 2-(2,3-epoxycylopentyl)ethyl, and 3-(2,3 epoxycylopentyl)propyl.

In a specific embodiment, the organopolysiloxane (A′′′) has the general formula:

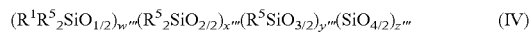

$$(R^1R^5{}_2SiO_{1/2})_{w'''}(R^5{}_2SiO_{2/2})_{x'''}(R^5SiO_{3/2})_{y'''}(SiO_{4/2})_{z'''} \quad (IV)$$

wherein each $R^1$ is defined above and each $R^5$ is independently selected from $R^1$ and an epoxy-substituted group, with the proviso that at least two of $R^5$ are epoxy-substituted groups, and w′′′, x′′′, y′′′, and z′′′ are mole fractions such that w′′′+x′′′+y′′′+z′′′=1. As understood in the art, for linear organopolysiloxanes, subscripts y′′′ and z′′′ are generally 0, whereas for resins, subscripts y′′′ and/or z′′′>0. Various alternative embodiments are described below with reference to y′′′ and z′′′. In these embodiments, the subscript w′′′ may have a value of from 0 to 0.9999, alternatively from 0 to 0.999, alternatively from 0 to 0.99, alternatively from 0 to 0.9, alternatively from 0.9 to 0.999, alternatively from 0.9 to 0.999, alternatively from 0.8 to 0.99, alternatively from 0.6 to 0.99, The subscript x′′′ typically has a value of from 0 to 0.9, alternatively from 0 to 0.45, alternatively from 0 to 0.25. The subscript y′′′ typically has a value of from 0 to 0.99, alternatively from 0.25 to 0.8, alternatively from 0.5 to 0.8. The subscript z′′′ typically has a value of from 0 to 0.99, alternatively from 0 to 0.85, alternatively from 0.85 to 0.95, alternatively from 0.6 to 0.85, alternatively from 0.4 to 0.65, alternatively from 0.2 to 0.5, alternatively from 0.1 to 0.45, alternatively from 0 to 0.25, alternatively from 0 to 0.15.

The curing agent (C′′′) can be any curing agent suitable for curing the organopolysiloxane (A′′′). Examples of curing agents (C′′′) suitable for that purpose include phenolic compounds, carboxylic acid compounds, acid anhydrides, amine compounds, compounds containing alkoxy groups, compounds containing hydroxyl groups, or mixtures thereof or partial reaction products thereof. More specifically, examples of curing agents (C′′′) include tertiary amine compounds, such as imidazole; quaternary amine compounds; phosphorus compounds, such as phosphine; aluminum compounds, such as organic aluminum compounds; and zirconium compounds, such as organic zirconium compounds. Furthermore, either a curing agent or curing catalyst or a combination of a curing agent and a curing catalyst can be used as the curing agent (C′′′). The curing agent (C′′′) can also be a photoacid or photoacid generating compound.

The ratio of the curing agent (C′′′) to the organopolysiloxane (A′′′) is not limited. In certain embodiments, this ratio is from 0.1-500 parts by weight of the curing agent (C′′′) per 100 parts by weight of the organopolysiloxane (A′′′).

In other embodiments, at least one of the silicone compositions comprises a thiol-ene curable silicone composition. In these embodiments, the thiol-ene curable silicone composition typically comprises: (A′′′′) an organopolysiloxane having an average of at least two silicon-bonded alkenyl groups or silicon-bonded mercapto-alkyl groups per molecule; (B′′′′) an organosilicon compound having an average of at least two silicon-bonded mercapto-alkyl groups or silicon-bonded alkenyl groups per molecule capable of reacting with the silicon-bonded alkenyl groups or silicon-bonded mercapto-alkyl groups in the organopolysiloxane (A′′′′); (C′′′′) a catalyst; and (D′′′′) an optional organic compound containing two or more mercapto groups. When the organopolysiloxane (A′′′′) includes silicon-bonded alkenyl groups, the organosilicon compound (B′′′′) and/or the organic compound (D′′′′) include at least two mercapto groups per molecule bonded to the silicon and/or in the organic compound, and when the organopolysiloxane (A′′′′) includes silicon-bonded mercapto groups, the organosilicon compound (B′′′′) includes at least two silicon-bonded alkenyl groups per molecule. The organosilicon compound (B′′′′) and/or the organic compound (D′′′′) may be referred to as a cross-linker or cross-linking agent.

The catalyst (C′′′′) can be any catalyst suitable for catalyzing a reaction between the organopolysiloxane (A′′′′) and the organosilicon compound (B′′′′) and/or the organic compound (D′′′′). Typically, the catalyst (C′′′′) is selected from: i) a free radical catalyst; ii) a nucleophilic reagent; and iii) a combination of i) and ii). Suitable free radical catalysts for use as the catalyst (C′′′′) include photo-activated free radical catalysts, heat-activated free radical catalysts, room temperature free radical catalysts such as redox catalysts and alkylborane catalysts, and combinations thereof. Suitable nucleophilic reagents for use as the catalyst (C′′′′) include amines, phosphines, and combinations thereof.

In still other embodiments, at least one of the silicone compositions comprises a silicon hydride-silanol reaction curable silicone composition. In these embodiments, the silicon hydride-silanol reaction curable silicone composition typically comprises: (A′′′′′) an organopolysiloxane having an average of at least two silicon-bonded hydrogen atoms or at least two silicone bonded hydroxyl groups per molecule; (B′′′′′) an organosilicon compound having an average of at least two silicon-bonded hydroxyl groups or at least two silicon bonded hydrogen atoms per molecule capable of reacting with the silicon-bonded hydrogen atoms or silicon-bonded hydroxyl groups in the organopolysiloxane (A′′′′′); (C′′′′′) a catalyst; and (′′′′′) an optional active hydrogen containing compound. When the organopolysiloxane (A′′′′′) includes silicon-bonded hydrogen atoms, the organosilicon compound (B′′′′′) and/or the organic compound (D′′′′′) include at least two hydroxyl groups per molecule bonded to the silicon and/or in the active hydrogen containing compound, and when the organopolysiloxane (A′′′′′) includes silicon-bonded hydroxyl groups, the organosilicon compound (B′′′′′) includes at least two silicon-bonded hydrogen atoms per molecule. The organosilicon compound (B′′′′′) and/or the organic compound (D′′′′′) may be referred to as a cross-linker or cross-linking agent.

Typically, the catalyst (C′′′′′) is selected from: i) a Group X metal-containing catalyst such as platinum; ii) a base such as metal hydroxide, amine, or phosphine; and iii) combinations thereof.

Solidification conditions for such silicon hydride-silanol condensation-curable silicone compositions may vary. Typically, such compositions are mixed as a two-part system and subsequently cured under ambient conditions. However, heat may also be utilized during solidification.

Any of the silicone compositions may optionally and independently further comprise additional ingredients or components, especially if the ingredient or component does not prevent the organosiloxane of the composition from curing. Examples of additional ingredients include, but are not limited to, fillers; inhibitors; adhesion promoters; dyes; pigments; anti-oxidants; carrier vehicles; heat stabilizers; flame retardants; thixotroping agents; flow control additives; fillers, including extending and reinforcing fillers; and cross-linking agents. In various embodiments, the composition further comprises ceramic powder. The amount of ceramic powder can vary and may depend on the 3D printing process being utilized.

One or more of the additives can be present as any suitable wt. % of the particular silicone composition, such as about 0.1 wt. % to about 15 wt. %, about 0.5 wt. % to about 5 wt. %, or about 0.1 wt. % or less, about 1 wt. %, 2, 3, 4, 5, 6, 7, 8, 9, 10, 11, 12, 13, 14, or about 15 wt. % or more of the silicone composition.

In certain embodiments, the silicone compositions are shear thinning. Compositions with shear thinning properties may be referred to as psuedoplastics. As understood in the art, compositions with shear thinning properties are characterized by having a viscosity which decreases upon an increased rate of shear strain. Said differently, viscosity and shear strain are inversely proportional for shear thinning compositions. When the silicone compositions are shear thinning, the silicone compositions are particularly well suited for printing, especially when a nozzle or other dispense mechanism is utilized. A specific example of a shear-thing silicone composition is XIAMETER® 9200 LSR, commercially available from Dow Corning Corporation of Midland, MI.

In certain embodiments, at least one of the compositions, e.g. the first composition, the second composition, and/or any additional compositions, comprises the polymer. The polymer may be any of the silicone polymers described above. Alternatively or in addition, the polymer may comprise an organic polymer or resin. Alternatively still, the polymer may comprise an organic-silicone hybrid polymer. The polymer may be disposed in a vehicle or solvent.

The polymer may be a thermosetting and/or thermoplastic polymer or resin. Examples of suitable thermosetting and/or thermoplastic resins include epoxy, polyester, phenol, polyamide, polyimide, polyvinyl, polyvinyl ester (i.e., vinylester), and polyurethane resins, as well as modifications, and combinations thereof. Additionally, elastomers and/or rubbers can be added to or compounded with the uncured thermosetting and/or thermoplastic resin to improve certain properties such as impact strength. Other specific examples of suitable thermosetting and/or thermoplastic resins include those described above.

In certain embodiments, at least one of the compositions, e.g. the first composition, the second composition, and/or any additional compositions, comprises the metal. The metal may be any of metal or alloy, and may be a liquid or slurry. Typically, a low-melting metal is used such that the at least one composition comprising the metal and/or the metal itself can be melted in an extruder and extrusion printed and/or deposited accordingly. In some embodiments, sections comprising the metal may be formed during the printing process to add functionality (e.g. structural support, section separation, etc.). When the metal is a liquid, an appropriate solidification condition and/or mechanism is utilized. Such solidification conditions include sufficient cooling and forming a solid alloy with another material already presented on the substrate the liquid metal is being deposited onto. In some embodiments, the metal is a slurry of metal particles in a carrier such as water or a non-oxidizing solvent. The printed section formed from slurry can be further processed, such as via laser melting, etching, and/or sintering.

In certain embodiments, at least one of the compositions, e.g. the first composition, the second composition, and/or any additional compositions, comprises a slurry. In one embodiment, the slurry is a ceramic slurry. The ceramic slurry may be carried by water, and may be combined with one or more binders such as a polymer. Typically, the ceramic slurry can be dried/solidified via evaporation of the carrier (e.g. water) and/or drying. The dried/solidified ceramic slurry can be further processed or consolidated by heating, such as via convection, heat conduction, or radiation. Ceramics that may be used to form the ceramic slurry include oxides of various metals, carbides, nitrides, borides, silicides, and combinations and/or modifications thereof. In some embodiments, as mentioned above, the slurry is a metal slurry. In these or other embodiments, the slurry comprises, alternatively is a polymer slurry. The polymer slurry is typically a solution or dispersion of a polymer in water or an organic solvent. The polymer slurry may comprise any suitable polymer, and typically comprises a viscosity for printing at ambient or elevated temperatures.

The compositions can be of various viscosities. In certain embodiments, the composition has a viscosity less than 500, less than 250, or less than 100, centistokes at 25° C., alternatively a viscosity of from 1 to 1,000,000 centistokes at 25° C., alternatively from 1 to 100,000 centistokes at 25° C., alternatively from 1 to 10,000 centistokes at 25° C. Viscosity of each composition can be changed by altering the amounts and/or molecular weight of one or more components thereof. Viscosity may be adjusted to match components of the AM system 106 (e.g. the nozzle 108) to control heat, speed, or other parameters associated with printing. As readily understood in the art, kinematic viscosity may be measured in accordance with ASTM D-445 (2011), entitled "Standard Test Method for Kinematic Viscosity of Transparent and Opaque Liquids (and Calculation of Dynamic Viscosity)."

As will be appreciated from the disclosure herein, the compositions may be in any form suitable for printing and, subsequently, for solidification after printing. Accordingly, each composition utilized may independently be in a liquid, solid, or semi-solid form. For example, each composition may be utilized as a liquid suitable for forming streams and/or droplets, a powder, and/or a heat-meltable solid, depending on the particular composition and printing conditions selected and as described above.

Moreover, any of the compositions described above may be a single part or a multi-part composition, as described above with reference to certain silicone compositions. Certain compositions are highly reactive such that multi-part compositions prevent premature mixing and curing of the components. The multi-part composition may be, for example, a two-part system, a three-part system, etc. contingent on the selection of the composition and the components thereof. Any component of the composition may be separate from and individually controlled with respect to the remaining components. In general, as will be understood in view of the description above, when the compositions are multi-part compositions, the separate parts of the multi-part composition may are mixed in the static mixer 20 directly prior to printing (e.g. in line with the nozzle 108).

The following examples, illustrating embodiments of this disclosure, are intended to illustrate and not to limit the invention.

Example 1: Static Mixer

Figure 18:
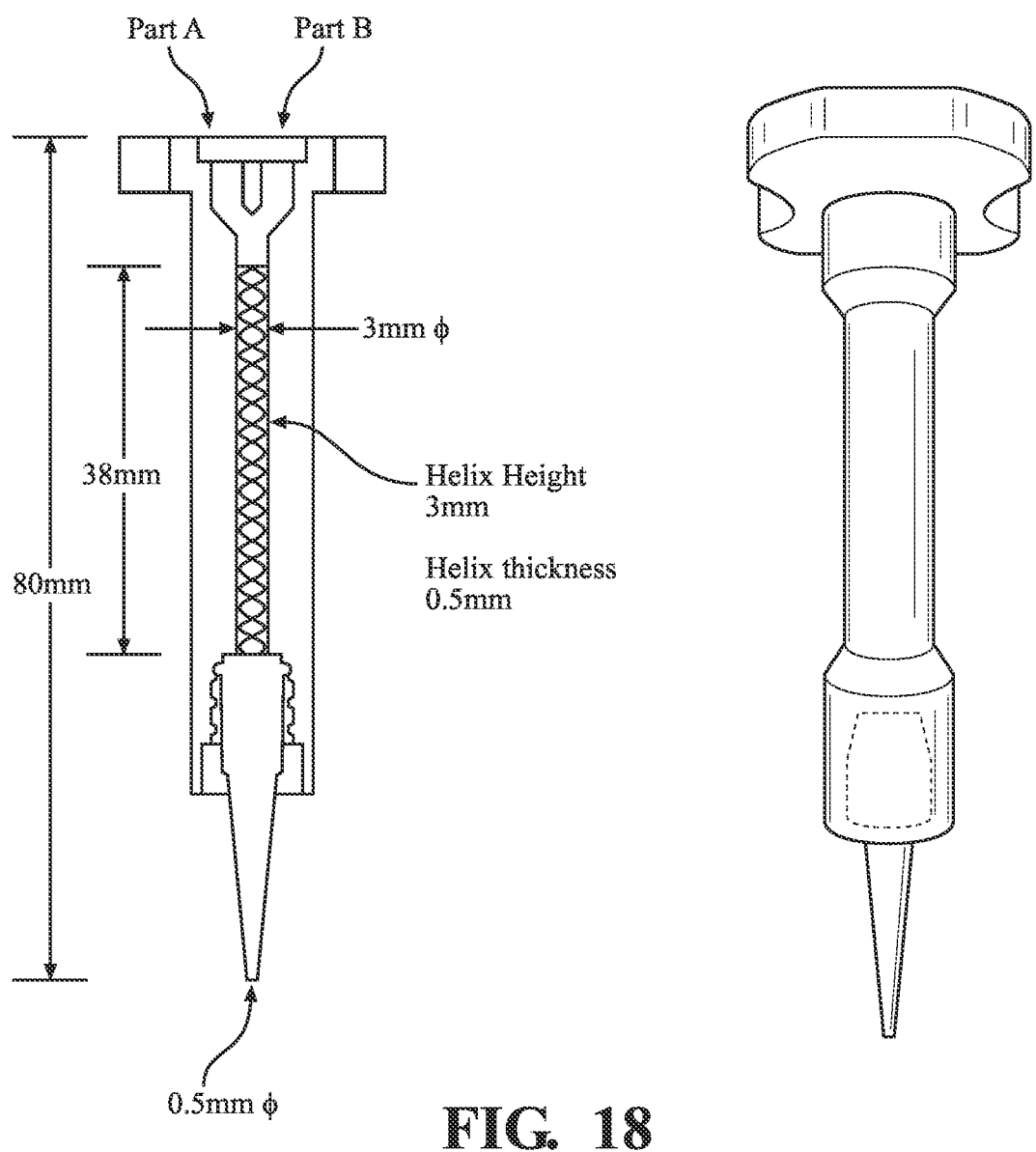
FIG. 18 is a diagram and image of a static mixer comprising a series of helical mixing elements prepared in accordance with one embodiment of the present disclosure.

A static mixer is having the design shown in FIGS. 6 and 18, with is formed via stereolithography AM (SLA) printer (FormLabs® Form 2, using FormLabs Standard Clear Resin (methacrylic acid ester mixture with photoinitiator)). The helical mixing elements were fabricated with a taper angle of $\pi/6$ radians, a release angle of $\pi/4$ radians, and a transfer angle of $\pi/4$ radians.

A silicone composition ($CaCO_3$ filled, moisture curable silicone composition of viscosity 45 Pa·s (25° C.) and a shear rate of 100 $s^{-1}$) is pushed through the static mixer of Example 1 and, separately, through a standard kenics-type mixer, in a simulated extrusion process at various extrusion rates, and the pressure to sustain such extrusion rates is monitored to assess the corresponding pressure drop, as set forth in Table 1 below.

TABLE 1

Over-Extrusion Assessment Results

| Example | Extrusion Rate (mL/min) | Plot |
|---|---|---|
| 2 | 100 | FIG. 19A |
| Comp. 1 | 100 | FIG. 19B |
| 3 | 150 | FIG. 20A |
| Comp. 2 | 150 | FIG. 20B |
| 4 | 200 | FIG. 21A |
| Comp. 3 | 200 | FIG. 21B |

As set forth in Table a above, the results of the simulated extrusion process is shown in FIGS. 19-21, where FIGS. 19-21A show the pressures corresponding to the inventive static mixer and FIGS. 19-21B how the pressures corresponding to the comparative kenics-type mixer. As shown, the inventive static mixer includes a significantly lower pressure requirement (as measured by a pressure drop across the length of the mixer) to sustain a given extrusion rate compared to a standard kenics-type mixer.

The performance of the static mixer is further assessed by repeating the simulated extrusion process for 30 seconds at the indicated feed rate and then cutting the flow. Upon cessation of the flow, the print head automatically moves so that it is wiped by that action. Silicone extruded after cessation of the flow is collected for 15 seconds, weighed to determine the amount of over-extrusion. The over-extrusion procedure is repeated 60 times, and the compiled results set forth in Table 2 below:

TABLE 2

Over-Extrusion Assessment Results

| Feed Rate | Mean | | STD | | % |
|---|---|---|---|---|---|
| (mL/min) | Comp. 4 | Example 5 | Comp. 4 | Example 5 | Improvement |
| 1 | 0.0286 | 0.0156 | 0.0017 | 0.0040 | 45.4545 |
| 2 | 0.0517 | 0.0269 | 0.0192 | 0.0023 | 47.9691 |
| 3 | 0.0376 | 0.0321 | 0.0040 | 0.0029 | 14.6277 |

As shown in Table 2, the inventive static mixer results in a significantly lower amount of over-extrusion compared to a standard kenics-type mixer, evidencing significant improvement for start-stop and tracking abilities for AM/3D-printing applications.

Additive Manufacturing System

Figure 22:
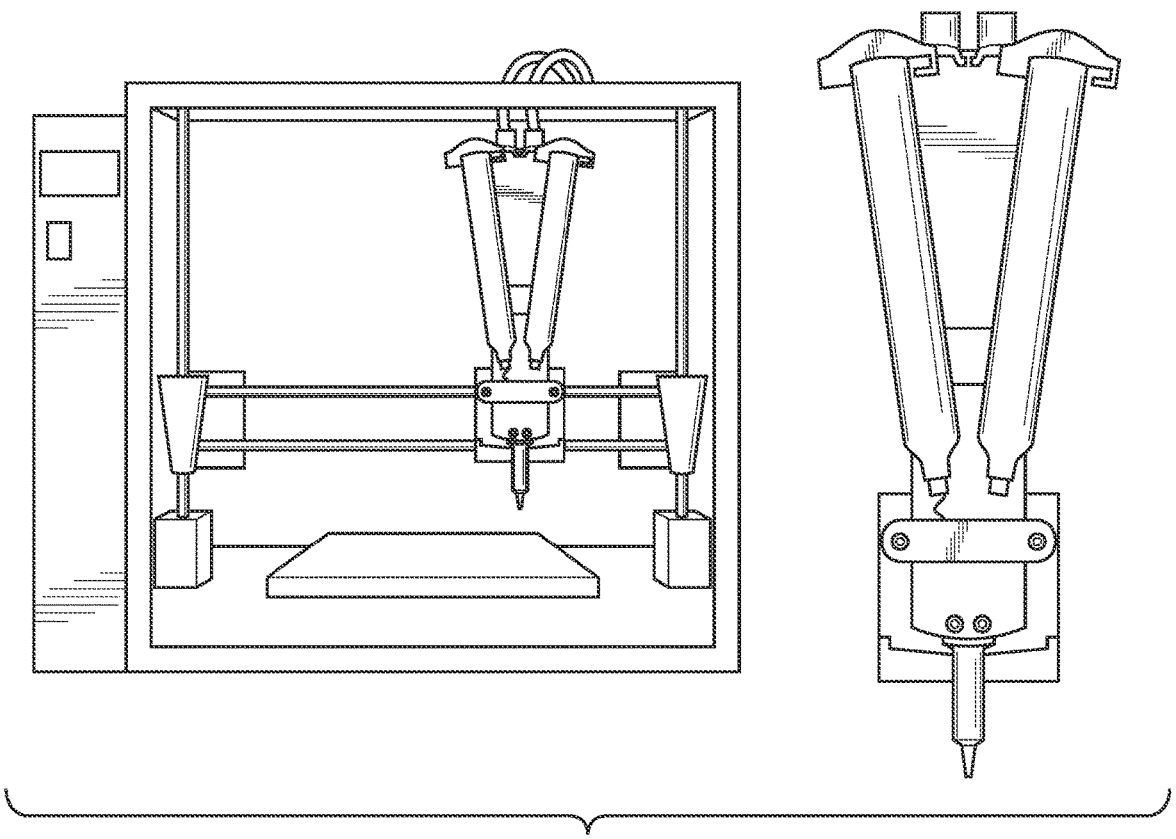
FIG. 22 is an image of an additive manufacturing system prepared in accordance with one embodiment of the present disclosure.

An additive manufacturing system (two-part silicone SEAM machine, as shown in FIG. 22) is prepared using the static mixer prepared above. In particular, the AM system is built on a thermoplastic material extrusion machine (Lulzbot, TAZ6) with twin progressive cavity pumps (ViscoTech) to finely dispense silicone.

Figure 23:
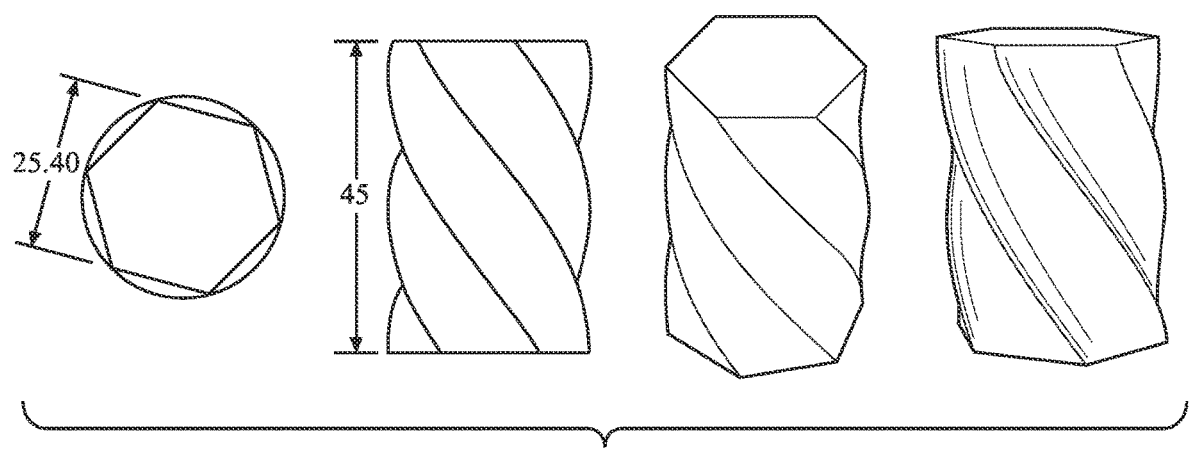
FIG. 23 is an 3D article prepared with an additive manufacturing method using the additive manufacturing system of FIG. 22.

The AM system is utilized to prepare a 3D article, as shown in FIG. 23, with a slow curing silicone composition (Dow Silastic LTC 9400-50 LSR). The twisted hexagon shape was selected due to the difficulty of preparing such an article using molds, due to the lack of flat surfaces and the complexity of machining a mold with the impression of the twisted surface.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular. Further, it is to be understood that the terms "right angle", "orthogonal", "perpendicular", and "parallel" are generally employed herein in a relative and not an absolute sense. Further, it will be appreciated that the terms "substantially", "about", "essentially", etc. indicate minor deviations of the property being modified. Such deviation may be of from 0-10%, alternatively of from 0-5%, alternatively of from 0-3% of a particular property.

Likewise, it is also to be understood that the appended claims are not limited to express and particular assemblies, systems, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9"

includes various individual integers, such as 3, as well as individual numbers including a decimal point (or fraction), such as 4.1, which may be relied upon and provide adequate support for specific embodiments within the scope of the appended claims.

The invention claimed is:

1. A static mixer, comprising:
a housing defining an internal mixing cavity that longitudinally extends along a central axis between an inlet and an outlet and is adapted for axial flow of a fluid therethrough; and
a mixing element disposed within the mixing cavity, the mixing element configured to be free from an impingement surface oriented substantially perpendicular to a main direction of fluid flow through the internal mixing cavity and comprising an elongated mixing blade oriented longitudinally within the mixing cavity and having a nose axially oriented toward the inlet;
wherein the nose of the mixing blade comprises at least one leading edge extending obliquely inward and toward the inlet from a lateral side of the mixing blade to an apex;
wherein each leading edge is tapered toward the inlet and comprises a pair of longitudinally opposing taper surfaces convergent at a taper angle ($\alpha 1$) subtended by a thickness of the mixing blade at the nose, where $0<\alpha 1<\pi$ radians; and
wherein:
(i) the mixing blade is further defined as a helical mixing blade, the helical mixing blade comprising a curved elongated chevron-shaped sheet describing a single-twist circular helical shape and a pair of opposing lateral edges adjacent to and in sealed relation with an interior surface of the mixing cavity;
(ii) the mixing blade is further defined as a corrugated mixing blade, the corrugated mixing blade comprising a corrugated planar chevron-shaped sheet having a pair of opposing lateral edges adjacent to and in sealed relation with an interior surface of the mixing cavity; or
(iii) both (i) and (ii).

2. The static mixer of claim 1, wherein:
(i) the mixing blade comprises an opposing pair of the leading edges convergent at the apex;
ii each leading edge is oriented obliquely to a radial plane of the mixing cavity by an attack angle ($\gamma$), where $0<\gamma<[\pi/2]$ radians; or
(iii) a combination of (i) and (ii).

3. The static mixer of claim 1, wherein the mixing blade is monolithic in construction.

4. The static mixer of claim 1, wherein the static mixer comprises a plurality of the mixing elements disposed in a series along the central axis of the mixing cavity, and wherein:
(i) the series comprises at least 3 of the mixing elements;
(ii) the mixing elements are disposed coaxially along the central axis of the mixing cavity in the series;
(iii) adjacent mixing elements in the series are in axially offset relation to one another;
(iv) each mixing element is monolithic in construction;
(v) the series of mixing elements is monolithic in construction; or
(vi) any combination of (i)-(v).

5. The static mixer of claim 1, wherein the static mixer comprises a plurality of the mixing elements disposed in a series along the central axis of the mixing cavity, and wherein:
(i) the housing is formed via an additive manufacturing process;
(ii) each mixing element is formed via an additive manufacturing process;
(iii) the housing and each mixing element are monolithic in construction; or
(iv) any combination of (i)-(iii).

6. The static mixer of claim 1, wherein:
(i) the static mixer comprises a polymeric material;
(ii) the static mixer comprises a ceramic;
(iii) the static mixer comprises a metal; or
(iv) any combination of (i)-(iii).

7. The static mixer of claim 1, wherein the housing is operatively coupled to a nozzle in fluid communication with the mixing cavity via the outlet.

8. The static mixer of claim 1, wherein the mixing blade comprises a tail axially oriented toward the outlet, the tail comprising at least one trailing edge extending obliquely outward and toward the outlet from a vertex to a lateral side of the mixing blade.

9. The static mixer of claim 8, wherein:
(i) the mixing blade comprises an opposing pair of the trailing edges convergent at the vertex;
(ii) each trailing edge is oriented obliquely to a radial plane of the mixing cavity by a release angle ($\beta$), where $0<\beta<[\pi/2]$ radians;
(iii) each trailing edge is tapered toward the outlet and comprises a pair of longitudinally opposing taper surfaces convergent at a taper angle ($\alpha^2$) subtended by a thickness of the mixing blade at the tail, where $0<\alpha^2<\pi$ radians; or
(iv) any combination of (i)-(iii).

10. The static mixer of claim 1, wherein the mixing element comprises a plurality of mixing blades disposed in a stack along a length of the mixing cavity, and wherein:
(i) the stack comprises at least 3 of the mixing blades;
(ii) the stack comprises at least 2 adjacent mixing blades in axially offset relation to one another;
(iii) the stack is monolithic in construction; or
(iv) any combination of (i)-(iii).

11. The static mixer of claim 10, wherein:
(i) the mixing element comprises at least 2 rows of the mixing blades;
(ii) the mixing element comprises at least 2 stacks of the mixing blades; or
(iii) both (i) and (ii).

12. The static mixer of claim 1, wherein the mixing element comprises a plurality of mixing blades disposed in a row along a width of the mixing cavity, and wherein:
(i) the row comprises at least 3 of the mixing blades;
(ii) the row comprises at least 2 adjacent mixing blades disposed in parallel face-to-face spaced apart relation;
(iii) the row is monolithic in construction; or
(iv) any combination of (i)-(iii).

13. The static mixer of claim 12, wherein:
(i) the mixing element comprises at least 2 rows of the mixing blades;
(ii) the mixing element comprises at least 2 stacks of the mixing blades; or
(iii) both (i) and (ii).

14. The static mixer of claim 12, wherein:
(i) each mixing blade is monolithic in construction;
(ii) each mixing blade is formed via an additive manufacturing process;

(iii) the mixing element is monolithic in construction;
(iv) the mixing element is formed via an additive manufacturing process; or
(v) any combination of (i)-(iv).

15. The static mixer of claim 1, further comprising a temperature control unit operatively connected to the housing.

16. The static mixer of claim 15, wherein the temperature control unit comprises a jacket disposed about the mixing cavity of the housing, and wherein:
(i) the jacket defines a chamber in fluid communication with the housing;
(ii) the jacket comprises a tubular chamber coiled about the mixing cavity; or
(iii) both (i) and (ii).

17. The static mixer of claim 16, wherein:
(i) the jacket is formed via an additive manufacturing process;
(ii) the jacket and the housing are monolithic in construction; or
(iii) both (i) and (ii).

18. An additive manufacturing system comprising the static mixer according to claim 1 and a temperature control unit adjacent the static mixer.

* * * * *